(12) United States Patent
Kamouchi et al.

(10) Patent No.: US 9,958,619 B2
(45) Date of Patent: May 1, 2018

(54) OPTICAL CONNECTOR CLEANING TOOL

(71) Applicants: NTT Advanced Technology Corporation, Kanagawa (JP); NTT-AT Creative Corporation, Tokushima (JP)

(72) Inventors: Terumasa Kamouchi, Tokyo (JP); Masayuki Murakami, Tokyo (JP); Masaaki Konishi, Tokyo (JP); Takenobu Hamano, Tokyo (JP); Setsuo Shoji, Tokushima (JP)

(73) Assignees: NTT ADVANCED TECHNOLOGY CORPORATION, Kawasaki-shi, Kanagawa (JP); NTT-AT CREATIVE CORPORATION, Tokushima (JP)

( * ) Notice: Subject to any disclaimer, the term of this patent is extended or adjusted under 35 U.S.C. 154(b) by 330 days.

(21) Appl. No.: 14/774,683

(22) PCT Filed: Mar. 13, 2013

(86) PCT No.: PCT/JP2013/057015
§ 371 (c)(1),
(2) Date: Sep. 10, 2015

(87) PCT Pub. No.: WO2014/141405
PCT Pub. Date: Sep. 18, 2014

(65) Prior Publication Data
US 2016/0041345 A1    Feb. 11, 2016

(51) Int. Cl.
*G02B 6/00* (2006.01)
*B08B 1/00* (2006.01)
*G02B 6/38* (2006.01)

(52) U.S. Cl.
CPC .............. *G02B 6/3866* (2013.01); *B08B 1/00* (2013.01); *B08B 1/006* (2013.01); *B08B 1/008* (2013.01); *B08B 2240/02* (2013.01)

(58) Field of Classification Search
CPC ........... B08B 1/00; B08B 1/001; B08B 1/003; B08B 1/006; B08B 1/008; B08B 1/04; B08B 2240/02; G02B 6/3866
(Continued)

(56) References Cited

FOREIGN PATENT DOCUMENTS

| JP | 2008-003302 A | 1/2008 |
|----|---------------|--------|
| JP | 2007-003901 A | 1/2012 |

(Continued)

*Primary Examiner* — Mark Spisich
(74) *Attorney, Agent, or Firm* — Womble Bond Dickinson (US) LLP

(57) ABSTRACT

An optical connector cleaning tool includes a supply reel (11) having a belt-like cleaning cloth (3), and a winding bobbin (12) for winding the cleaning cloth (3). The optical connector cleaning tool also includes a housing (7) which rotatably supports the supply reel (11) and winding bobbin (12), a cleaning head (13) which comes in contact with the cleaning cloth (3), and a pressing member (5) which supports the cleaning head (13) and moves in a longitudinal direction with respect to the housing (7). The optical connector cleaning tool further includes a slide spring (53) which biases the pressing member (5) forward, and a transmission mechanism (33) which transmits an action of the pressing member (5) to the winding bobbin (12). The transmission mechanism (33) includes a rack (32) on the side of the pressing member (5), and a pinion on the side of the winding bobbin (12). When the pressing member (5) retreats with respect to the housing (7), the transmission mechanism (33) rotates the winding bobbin (12) in a winding direction so as to feed the cleaning cloth (3). This optical connector cleaning tool can easily clean an optical connector plug while achieving downsizing by using a simple structure.

14 Claims, 20 Drawing Sheets

(58) Field of Classification Search
USPC .................. 15/97.1, 210.1; 385/134, 147
See application file for complete search history.

(56) References Cited

FOREIGN PATENT DOCUMENTS

| | | |
|---|---|---|
| JP | 2012-053270 A | 3/2012 |
| JP | 2012-063506 A | 3/2012 |
| WO | WO 2009/119437 A | 10/2009 |

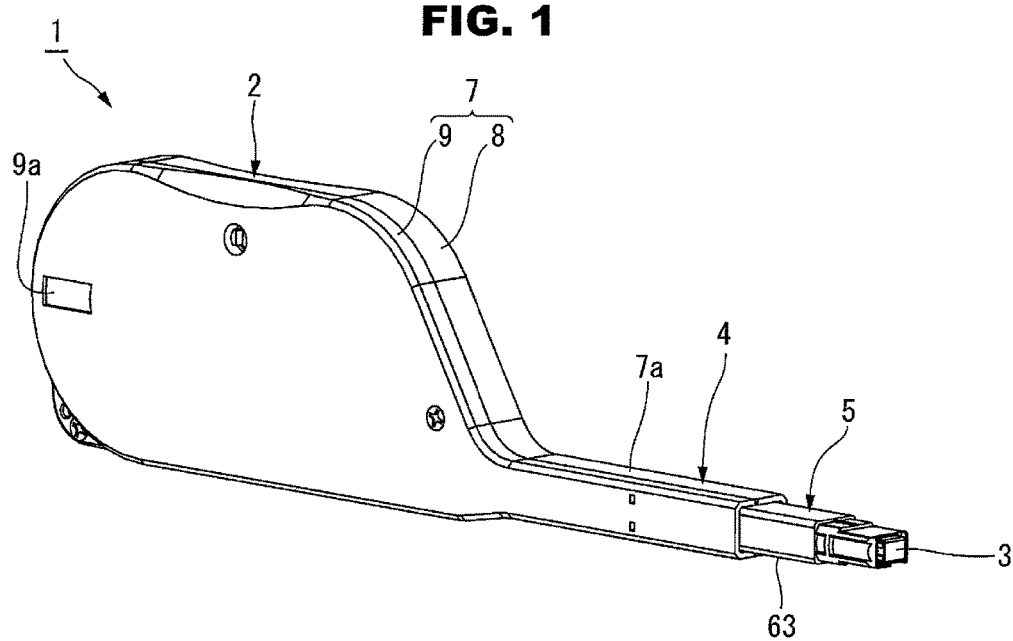
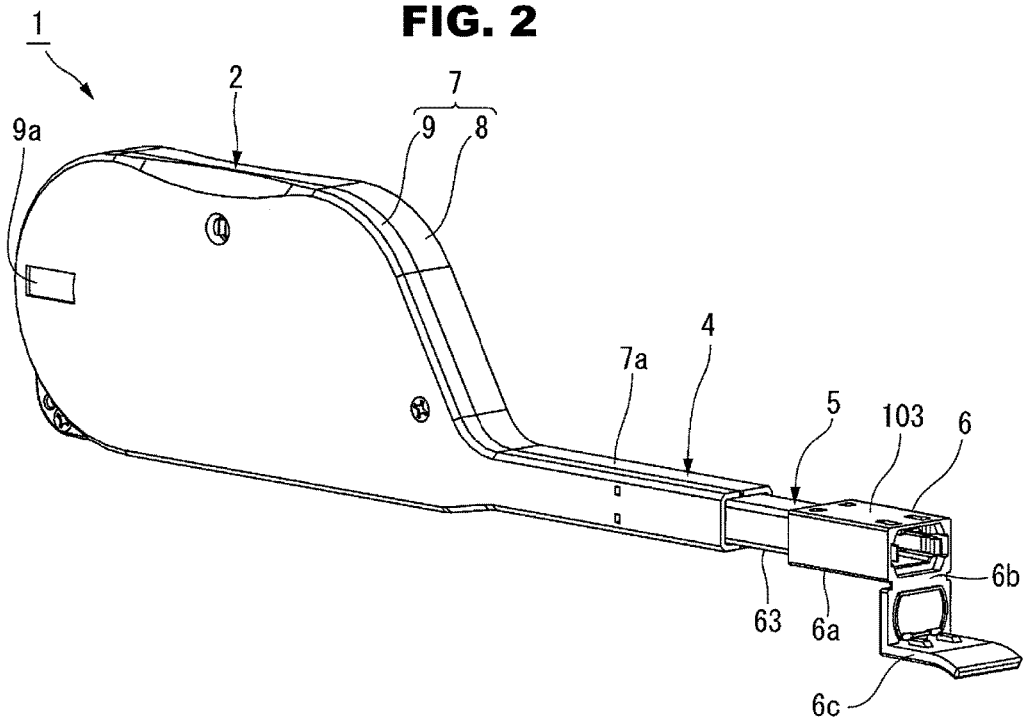

OPTICAL CONNECTOR CLEANING TOOL

TECHNICAL FIELD

The present invention relates to an optical connector cleaning tool for cleaning the connection end face of an optical connector with a cleaning cloth.

BACKGROUND ART

An example of the conventional optical connector cleaning tools of this kind is described in, e.g., patent literature 1. This optical connector cleaning tool disclosed in patent literature 1 includes a housing having a size which the user can grip in his or her hand, a cleaning tape accommodated in this housing, and a tape feeding mechanism for feeding the cleaning tape.

The housing has a relatively narrow cylindrical portion. A cleaning head for pressing the cleaning tape against an optical connector is formed at the distal end portion of this cylindrical portion. The cleaning tape is pulled out from a supply reel accommodated in the housing to the front surface side of the cleaning head through the above-mentioned cylindrical portion. Also, this cleaning tape is reversed by the cleaning head, and guided to a winding bobbin in the housing through the cylindrical portion.

The above-mentioned tape feeding mechanism includes an operation dial rotatably formed in the housing, and rotates the winding bobbin together with this operation dial.

When cleaning the connection end face of an optical connector by using this conventional optical connector cleaning tool, the user grips the housing, presses the cleaning tape together with the cleaning head against the optical connector, and rotates the operation dial in this state.

Patent literature 2 has disclosed an optical connector cleaning tool capable of feeding a cleaning thread by the force of pressing a cleaning member against an optical connector. This optical connector cleaning tool described in patent literature 2 converts the above-mentioned pressing force into a rotational force by using a cam having a spiral groove, thereby rotating a cleaning head and winding the cleaning thread.

RELATED ART LITERATURE

Patent Literature

Patent literature 1: Japanese Patent Laid-Open No. 2008-3302
Patent literature 2: International Publication WO2009/119437

DISCLOSURE OF INVENTION

Problem to be Solved by the Invention

The optical connector cleaning tool described in patent literature 1 has the problem that the cleaning work is complicated. This is so because the user must simultaneously perform two actions, i.e., the action of pressing the cleaning tape together with the cleaning head against an optical connector, and the action of rotating the operation dial.

In addition, the direction of the force for the action of pressing the cleaning tape against an optical connector and the direction of the force for the action of rotating the operation dial are different by 180°. Accordingly, some users cannot apply the pressing power necessary for cleaning to the connection end face.

Note that optical connectors as cleaning targets include an optical connector having a vertical end face and an optical connector having an inclined end face (the inclination angle is mainly 8°). To clean both of these end faces by pressing cloth against them, the prior art has given an inclination angle of 4° to the head, and improved a spring mechanism. The structure of this spring is complicated.

These inconveniences may be eliminated to some extent by adopting the arrangement in which the cleaning thread is fed by using the pressing force of pressing the cleaning thread against an optical connector as described in patent literature 2.

In this optical connector cleaning tool described in patent literature 2, however, the above-mentioned pressing force is converted into a rotational force by the cam having the spiral groove. This complicates the structure, and enlarges the structure when the cleaning tape is mounted.

The present invention has been made to solve the above-mentioned conventional problem, and has as its object to provide an optical connector cleaning tool capable of always obtaining constant cleaning results even for different users by a simple optical connector cleaning operation, while achieving downsizing by using a simple structure.

Means of Solution to the Problem

To achieve the above object, an optical connector cleaning tool according to the present invention includes a supply reel around which a belt-like cleaning cloth is wound, a winding bobbin configured to wind the cleaning cloth fed from the supply reel, a housing configured to support the supply reel and the winding bobbin such that the supply reel and the winding bobbin are allowed to rotate in a direction in which the cleaning cloth is fed, a cleaning head configured to come in contact with a portion of the cleaning cloth positioned between the supply reel and the winding bobbin, a pressing member configured to support the cleaning head such that a portion of the cleaning cloth is pushed by the cleaning head and projected from the housing, and supported by the housing such that the pressing member is allowed to move in parallel in the projecting direction and a retreating direction opposite to the projecting direction, a slide spring configured to bias the pressing member in the projecting direction, and a transmission mechanism configured to transmit an action of the pressing member to the winding bobbin, the transmission mechanism including a rack formed in the pressing member, and a pinion formed in the winding bobbin such that the pinion meshes with the rack, and configured to rotate the winding bobbin in a winding direction such that the cleaning cloth is fed when the pressing member moves in the retreating direction with respect to the housing.

Also, this optical connector cleaning tool can clean optical connectors having a vertical end face and inclined end face with a simple structure by applying an elastic rubber material as the head.

Effect of the Invention

In the optical connector cleaning tool according to the present invention, the cleaning cloth is fed along with the action of pressing the cleaning cloth against an optical connector. This simplifies the operation because the cleaning cloth is wound by only an action in one direction. The transmission mechanism for feeding the cleaning cloth converts the pressing force into a rotational force by using the rack and pinion. Therefore, the structure is simpler than that when using a spiral groove, and hence can be made compact. In addition, the head is an elastic rubber material. This makes it possible, with a simple structure, to use the optical connector cleaning tool for both optical connectors having a vertical end face and inclined end face.

Accordingly, the present invention can provide an optical connector cleaning tool capable of easily cleaning an optical connector while achieving downsizing by using a simple structure.

BRIEF DESCRIPTION OF DRAWINGS

FIG. 1 is a perspective view of an optical connector cleaning tool according to the present invention, and shows a state in which a cap is detached;

FIG. 2 is a perspective view of the optical connector cleaning tool according to the present invention, and shows a state in which the cap is attached;

BEST MODE FOR CARRYING OUT THE INVENTION

Figure 3:
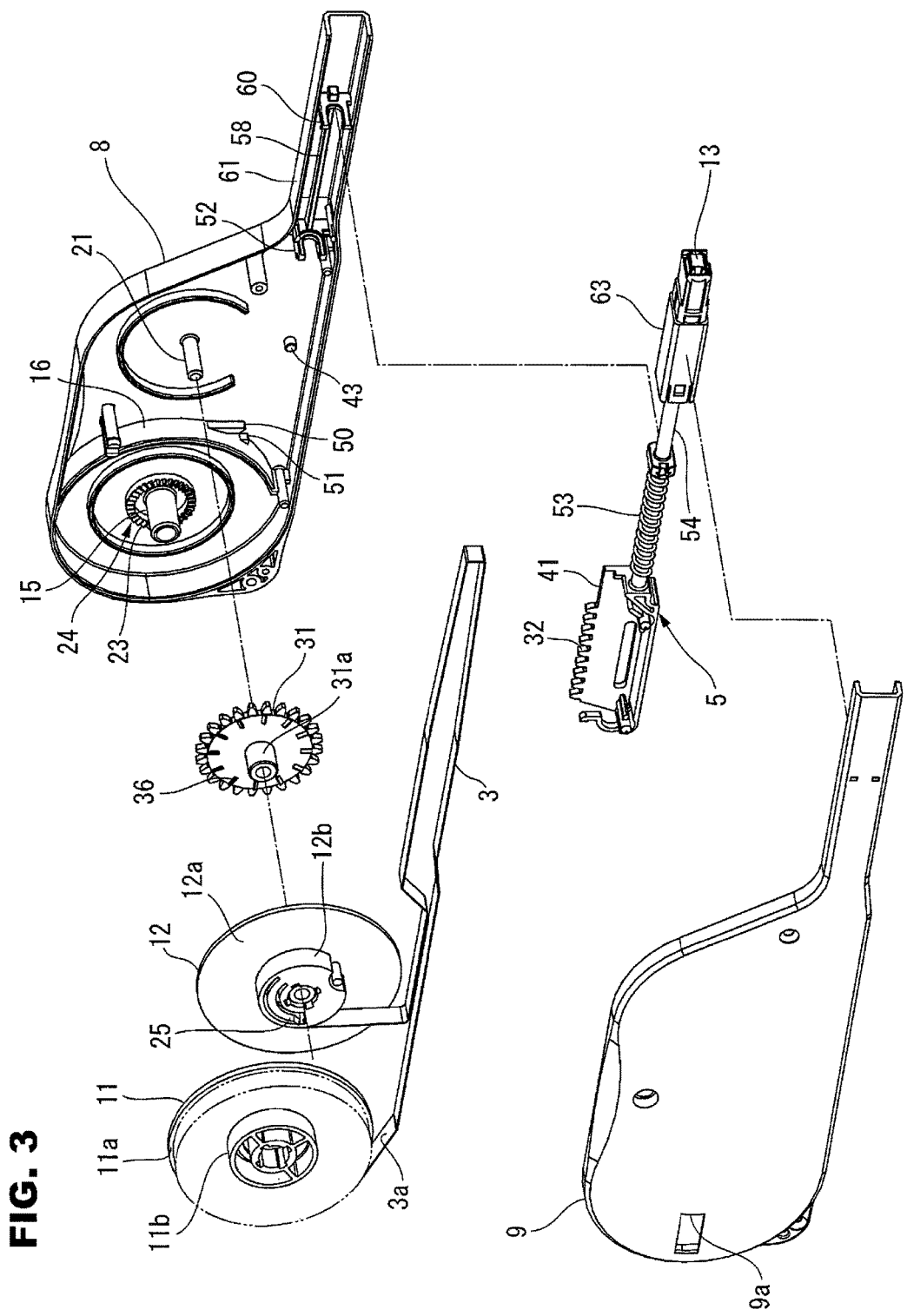
FIG. 3 is an exploded perspective view of the optical connector cleaning tool according to the present invention, and shows a state viewed from the left-half side of a housing.

An embodiment of an optical connector cleaning tool according to the present invention will be explained below with reference to FIGS. 1 to 26.

An optical connector cleaning tool 1 shown in FIG. 1 includes a grip 2 positioned on the left side of FIG. 1. A user (not shown) grips the grip 2 in his or her hand, and presses a cleaning cloth 3 exposed to the end portion on the right side of FIG. 1 against the connection end face of an optical connector plug (not shown), thereby cleaning the connection end face. In this embodiment, a direction pointing to the optical connector plug will be called forward (a direction to the lower right in FIG. 1), and the opposite direction will be called backward. Also, when explaining each member to be described below, a member positioned forward described above will be expressed as a front portion or front side, and a member positioned backward will be expressed as a rear portion or rear side.

Although an optical connector plug as a cleaning target of the optical connector cleaning tool 1 is not shown, the optical connector plug includes a plug already fitted in an optical fiber cable connection port of an electronic apparatus, and a stand-alone plug not fitted in an electronic apparatus. The optical connector cleaning tool 1 includes a nose 4 projecting forward from the grip 2, so as to be able to clean an optical connector plug positioned deep in the above-mentioned optical fiber cable connection port. The cleaning cloth 3 is held by a pressing member 5 exposed to the front end portion of the nose 4, and positioned at the front end of the nose 4.

When cleaning a stand-alone optical connector plug by using the optical connector cleaning tool 1, as shown in FIG. 2, a cap 6 is attached to the front end portion of the pressing member 5. As will be described in detail later, the cap 6 is so formed that a stand-alone optical connector plug can be attached in a state in which the cap 6 is attached to the pressing member 5.

The grip 2 is formed by a housing 7 of the optical connector cleaning tool 1. The nose 4 includes a square cylindrical portion 7a formed in the front end portion of the housing 7, and the front end portion of the pressing member 5, which protrudes forward from the square cylindrical portion 7a.

The housing 7 houses components such as the cleaning cloth 3 and pressing member 5 (to be described later) of the optical connector cleaning tool 1. As shown in FIG. 3, the housing 7 can be divided into two portions, i.e., a right-half portion 8 positioned on the right side in FIG. 3, and a left-half portion 9 positioned on the left side in FIG. 3.

The cleaning cloth 3 is formed into a long and narrow belt. As shown in FIG. 3, a predetermined length of the cleaning cloth 3 is wound around a supply reel 11. The cleaning cloth 3 is not limited to a belt, and may also be, e.g., a thread-like cleaning cloth or a material obtained by binding a plurality of thread-like cleaning cloths.

The distal end portion of the cleaning cloth 3 is attached to a winding bobbin 12. A portion of the cleaning cloth 3 positioned between the supply reel 11 and winding bobbin 12 is pushed forward by the pressing member 5 including a cleaning head 13 at the front end, and projected forward from the housing 7 through the square cylindrical portion 7a.

The cleaning cloth 3 is inserted into cleaning cloth passages 14 (see FIG. 4) formed along the pressing member 5 (to be described later). The cleaning cloth 3 is pulled out from the supply reel 11 when the winding bobbin 12 rotates and the distal end portion of the cleaning cloth 3 is wound around the winding bobbin 12. In this embodiment, the widthwise direction of the belt-like cleaning cloth 3 will simply be referred to as a horizontal direction hereinafter. Also, in this embodiment, a direction (the vertical direction in FIG. 4) perpendicular to both the longitudinal direction and horizontal direction will be referred to as a vertical direction for the sake of convenience.

Figure 5:
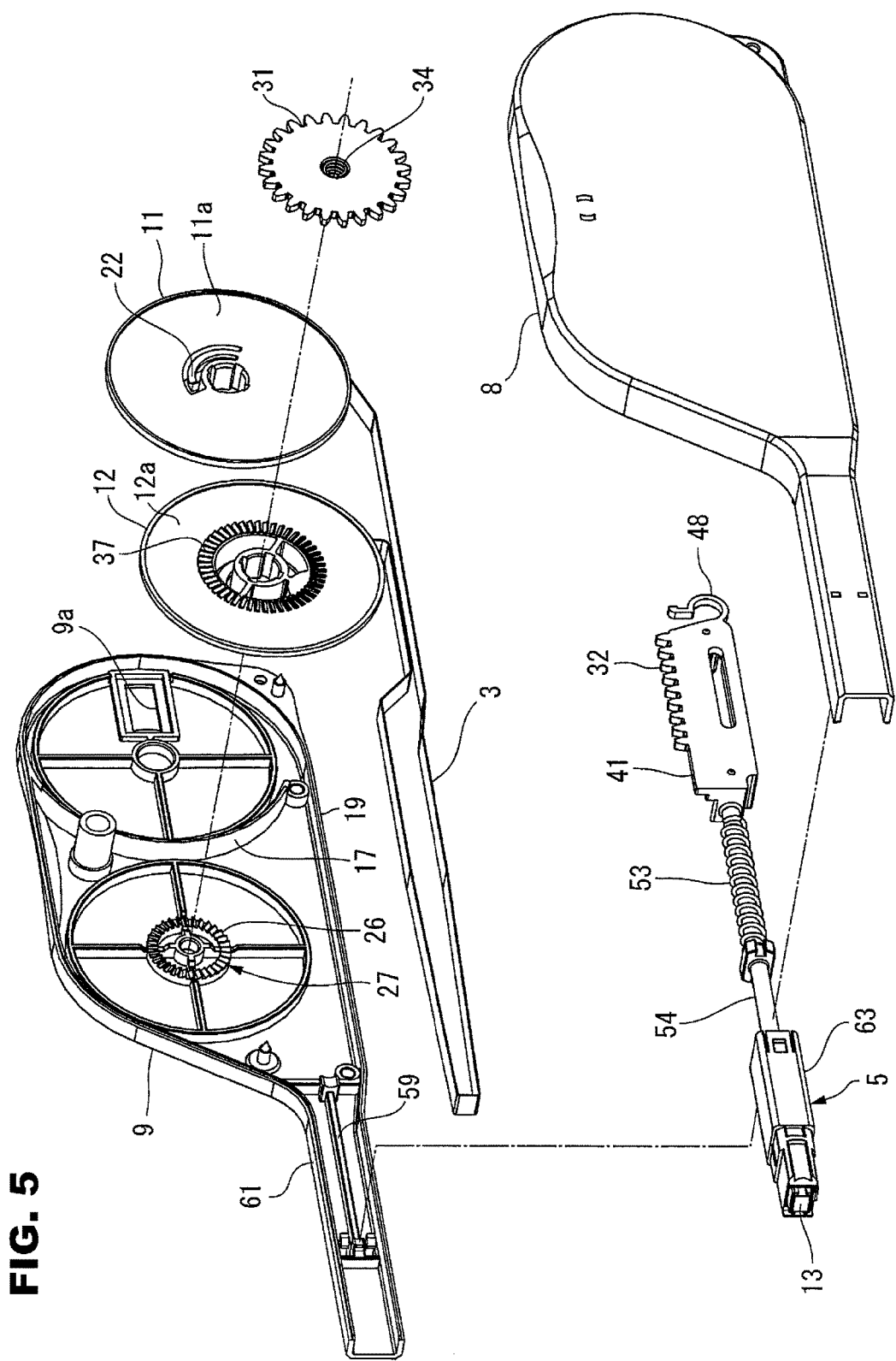
FIG. 5 is an exploded perspective view of the optical connector cleaning tool according to the present invention, and shows a state viewed from the right-half side of the housing.

The supply reel 11 is rotatably supported by a first spindle 15 so formed as to extend in the horizontal direction in the rear portion of the right-half portion 8 of the housing 7. The first spindle 15 extends through the axis of the supply reel 11. As shown in FIGS. 3 and 5, partitions 16 and 17 are formed in a portion for accommodating the supply reel 11 in the right-half portion 8 and left-half portion 9 of the housing 7. The partitions 16 and 17 are formed into an arc shape when viewed sideways so as to surround the supply reel 11.

The partition 16 formed in the right-half portion 8 of the housing 7 and the partition 17 formed in the left-half portion 9 of the housing 7 are connected as they are abutted against each other when the right-half portion 8 and left-half portion 9 are assembled. Therefore, the cleaning cloth 3 wound around the supply reel 11 is isolated from other portions in the housing 7 by the partitions 16 and 17. The cleaning cloth 3 is pulled out forward from inside the partitions 16 and 17 through a gap formed between a guide pin 18 (see FIG. 4) formed at one end of each of the partitions 16 and 17 and a bottom wall 19 of the housing 7.

A window 9a for visually checking the remaining amount of the cleaning cloth 3 is formed in the rear portion of the left-half portion 9. The window 9a is formed by a transparent plastic plate. It is also possible to form at least the left-half portion 9 of the housing 7 by using a transparent material, instead of forming the window.

The winding bobbin 12 is rotatably supported by a second spindle 21 so formed as to extend in the horizontal direction in the front portion of the grip 2. The second spindle 21 extends through the axis of the winding bobbin 12.

As shown in FIG. 3, the supply reel 11 and winding bobbin 12 are respectively formed by disk-like guides 11a and 12a, and cores 11b and 12b formed in the axes of the guides 11a and 12a so as to be positioned on the same axial line.

The cleaning cloth 3 is wound around the cores 11b and 12b. The cleaning cloth 3 wound around the cores 11b and 12b is accommodated in the housing 7 so as to regulate a movement in the widthwise direction by the guides 11a and 12a and the left-half portion 9 of the housing 7.

Figure 6:
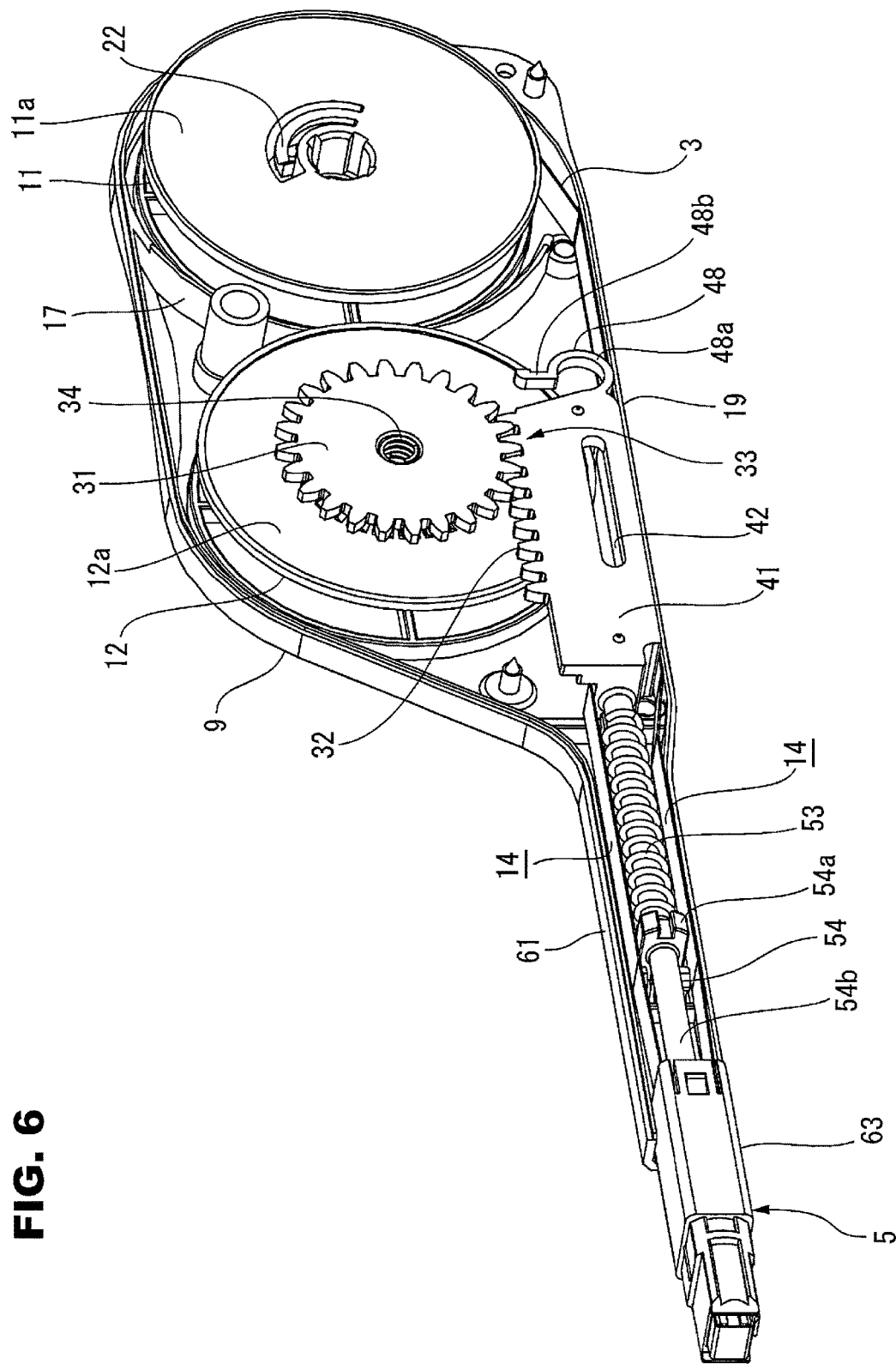
FIG. 6 is a perspective view of the optical connector cleaning tool in a state in which the right-half portion of the housing is removed from the left-half portion.

As shown in FIGS. 5 and 6, a pawl 22 is formed in a portion of the core 11b of the supply reel 11, which opposes the right-half portion 8 of the housing 7. The pawl 22 forms a reverse rotation preventing mechanism 24 on the side of the supply reel 11 in cooperation with a large number of pawls 23 (see FIG. 3) formed in the right-half portion 8 of the housing 7. The reverse rotation preventing mechanism 24 including this pawl-type one-way clutch regulates the rotational direction of the supply reel 11 in only one direction. The direction in which the rotation of the supply reel 11 is permitted is the direction in which the cleaning cloth 3 is pulled out. The direction in which the supply reel 11 rotates when the cleaning cloth 3 is pulled out is the counterclockwise direction in FIG. 3.

As shown in FIG. 3, a pawl 25 is formed in a portion of the core 12b of the winding bobbin 12, which opposes the left-half portion 9 of the housing 7. The pawl 25 forms a reverse rotation preventing mechanism 27 on the side of the winding bobbin in cooperation with a large number of pawls 26 (see FIG. 5) formed in the left-half portion 9. The reverse rotation preventing mechanism 27 including this pawl-type one-way clutch regulates the rotational direction of the winding bobbin 12 in only one direction. The direction in which the rotation of the winding bobbin 12 is permitted is the direction in which the cleaning cloth 3 is wound, and is the clockwise direction in FIG. 3.

Figure 7:
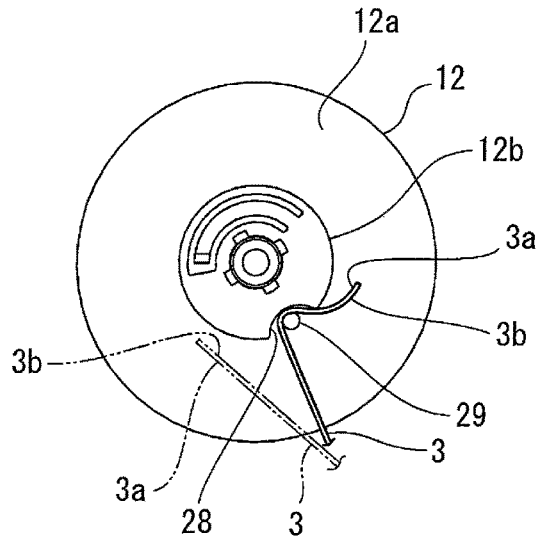
FIG. 7 is a side view of a winding bobbin.

As shown in FIG. 7, a recess 28 is formed in the outer circumferential portion of the core 12b of the winding bobbin 12. A pin 29 for hooking the distal end portion of the cleaning cloth 3 stands in the recess 28. The pin 29 extends from the guide 12a to the left in parallel to the axial line of the winding bobbin 12. The distal end portion of the cleaning cloth 3 is coated with an adhesive (not shown) beforehand. This adhesive prevents the cleaning cloth 3 wound around the supply reel 11 from getting loose after the supply reel is manufactured and before it is assembled. This adhesive is applied to an inner surface 3a (see FIG. 3) of the cleaning cloth 3. The inner surface 3a herein mentioned is a surface facing the axis in a state in which the cleaning cloth 3 is wound around the supply reel 11. Note that an adhesive tape may also be adhered, instead of the adhesive, on an outer surface 3b of the cleaning cloth 3, such that the adhesive surface of the adhesive tape is positioned on the extension of the cleaning cloth inner surface 3a.

The cleaning cloth 3 is pulled out from the supply reel 11 along the pressing member 5 (to be described later), and the distal end portion of the cleaning cloth 3 is so guided as to be readily wound around the winding bobbin 12. Consequently, the outer surface 3b of the cleaning cloth 3 opposes the core 12b of the winding bobbin 12 as indicated by the alternate long and two short dashed line in FIG. 7. In this state, the distal end portion of the cleaning cloth 3 cannot be adhered on the outer circumferential surface of the core 12b by the adhesive. In this embodiment, as indicated by the solid lines in FIG. 7, the distal end portion of the cleaning cloth 3 is hooked on the pin 29, and guided in a direction opposite to the winding direction (the clockwise direction in FIG. 7). Accordingly, the inner surface 3a of the cleaning cloth 3 opposes the outer circumferential surface of the core 12b, and the distal end portion of the cleaning cloth 3 is fixed to the core 12b by the above-mentioned adhesive.

As shown in FIGS. 5 and 6, the winding bobbin 12 is connected to the pressing member 5 (to be described later) via a transmission mechanism 33 including a bobbin rotating gear 31 positioned on the same axial line as that of the winding bobbin 12, and a rack 32 which meshes with the bobbin rotating gear 31.

Figure 8:
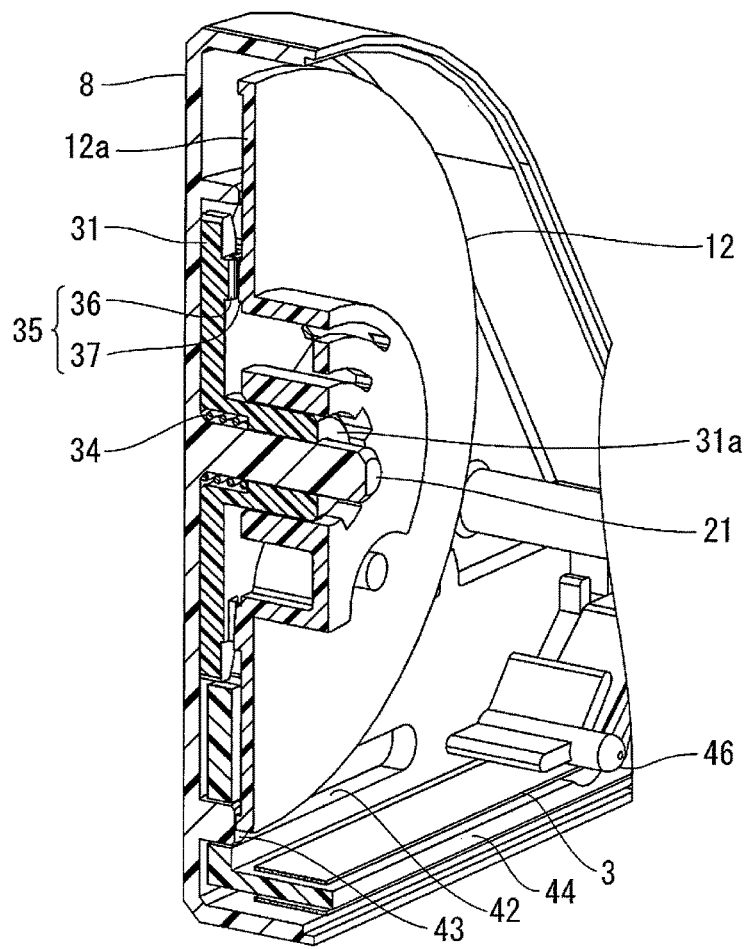
FIG. 8 is a cutaway perspective view showing the right-half portion of the housing and the winding bobbin.

As shown in FIG. 8, the bobbin rotating gear 31 is arranged between the guide 12a of the winding bobbin 12 and the right-half portion 8 of the housing 7.

The bobbin rotating gear 31 rotates the winding bobbin 12 in the winding direction, and is rotatably supported by the second spindle 21. In this embodiment, the bobbin rotating gear 31 is equivalent to a "pinion" in the present invention.

The winding bobbin 12 is rotatably fitted on a cylindrical shaft 31a of the bobbin rotating gear 31, and rotatably supported by the second spindle 21 via the cylindrical shaft 31a. A bobbin rotating gear spring 34 for biasing the bobbin rotating gear 31 toward the winding bobbin 12 is placed inside the cylindrical shaft 31a. The bobbin rotating gear spring 34 is a compressed coil spring, and inserted between the cylindrical shaft 31a and right-half portion 8 such that the second spindle 21 extends through the spring.

A one-way clutch 35 for transmitting a rotational force to the winding bobbin 12 only when the bobbin rotating gear 31 rotates in the winding direction is formed between the winding bobbin 12 and bobbin rotating gear 31. The one-way clutch 35 includes a large number of pawls 36 (see FIG. 3) formed on the bobbin rotating gear 31, and a large number of pawls 37 (see FIG. 5) one the side of the winding bobbin 12, which mesh with the pawls 36. The above-mentioned winding direction is the counterclockwise direction in FIG. 6.

That is, the winding bobbin 12 and bobbin rotating gear 31 rotate together in the winding direction. When the bobbin rotating gear 31 rotates in the direction opposite to the winding direction, however, the winding bobbin 12 is held stopped as its rotation is regulated by the action of the reverse rotation preventing mechanism 27 formed between the housing 7 and left-half portion 9. Therefore, the rack 32 (the pressing member 5) of the transmission mechanism 33 moves backward with respect to the housing 7, thereby rotating the bobbin rotating gear 31 and winding bobbin 12 together in the winding direction. Since the winding bobbin 12 rotates in the winding direction, the cleaning cloth 3 is pulled and sent out from the supply reel 11.

Figure 9:
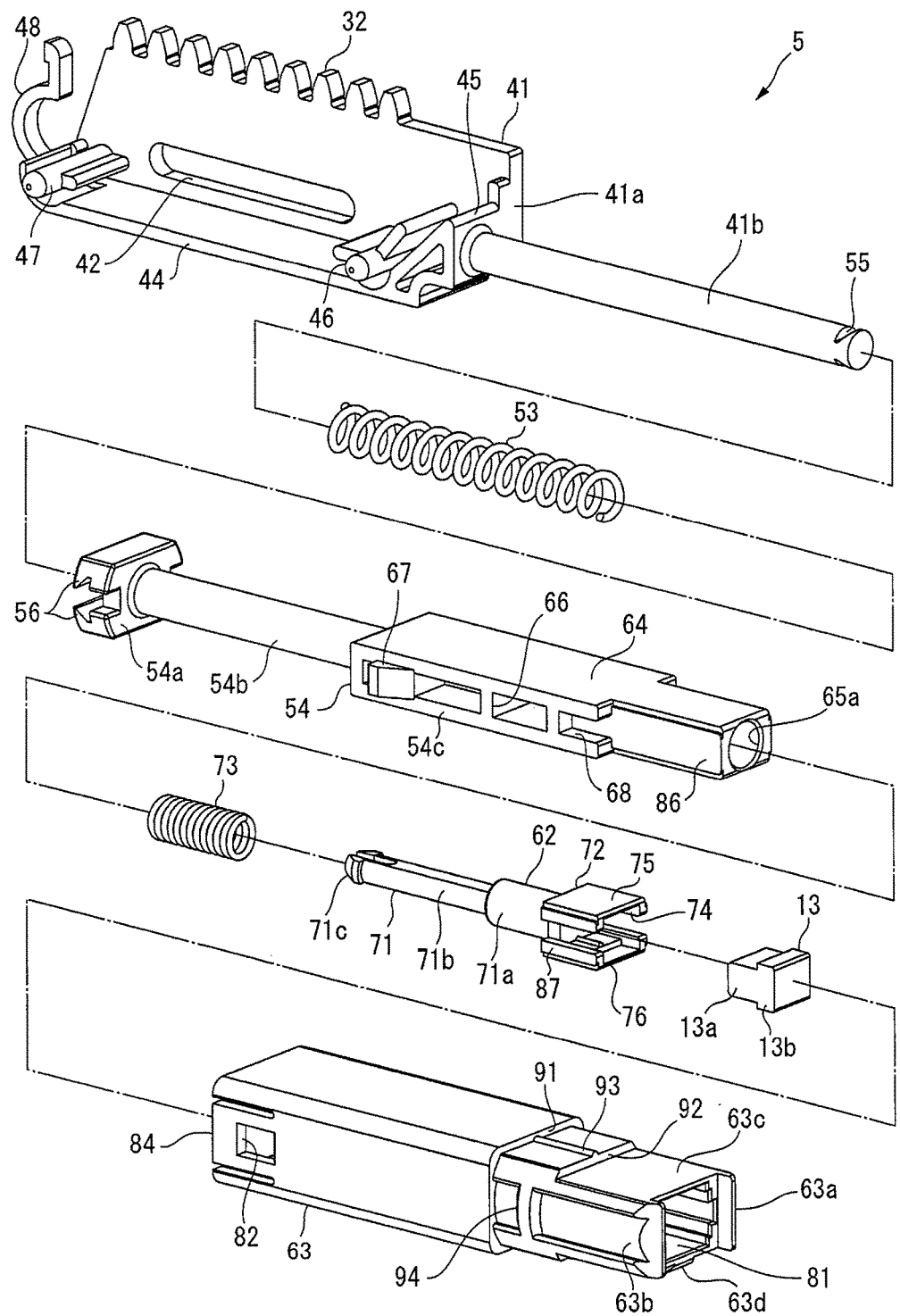
FIG. 9 is an exploded perspective view of a pressing member.

As shown in FIG. 9, the pressing member 5 is formed as an assembly by combining a plurality of members. The cleaning head 13 for pressing the cleaning cloth 3 against an optical connector plug is formed at the front end of the pressing member 5. The cleaning head 13 comes in contact with a portion of the cleaning cloth 3 positioned between the supply reel 11 and winding bobbin 12, and presses the cleaning cloth 3 against an optical connector plug.

The pressing member 5 supports the cleaning head 13 so that a portion of the cleaning cloth 3 is pushed by the cleaning head 13 and projected from the square cylindrical portion 7a of the housing 7. The cleaning cloth 3 is pulled out forward from the supply reel 11, turned and extended backward from the portion in contact with the cleaning head 13, and guided to the winding bobbin 12 from the rear end portion of the pressing member 5. As will be described in detail later, the pressing member 5 is supported by the housing 7 to move in parallel freely in the above-mentioned projecting direction (forward) and a retreating direction (backward) opposite to the projecting direction.

The read end portion of the pressing member 5 is formed by a slider 41 having the rack 32. The slider 41 includes a slider body 41a on which the rack 32 is formed, and a guide rod 41b projecting forward from the front end of the slider body 41a. A long hole 42 elongated in the longitudinal direction is formed in the slider body 41a. A projection 43 (see FIGS. 3 and 4) raised in the right-half portion 8 of the housing 7 is movably fitted in the long hole 42. The slider body 41a is supported by the projection 43 so as to be movable in the longitudinal direction.

Figure 4:
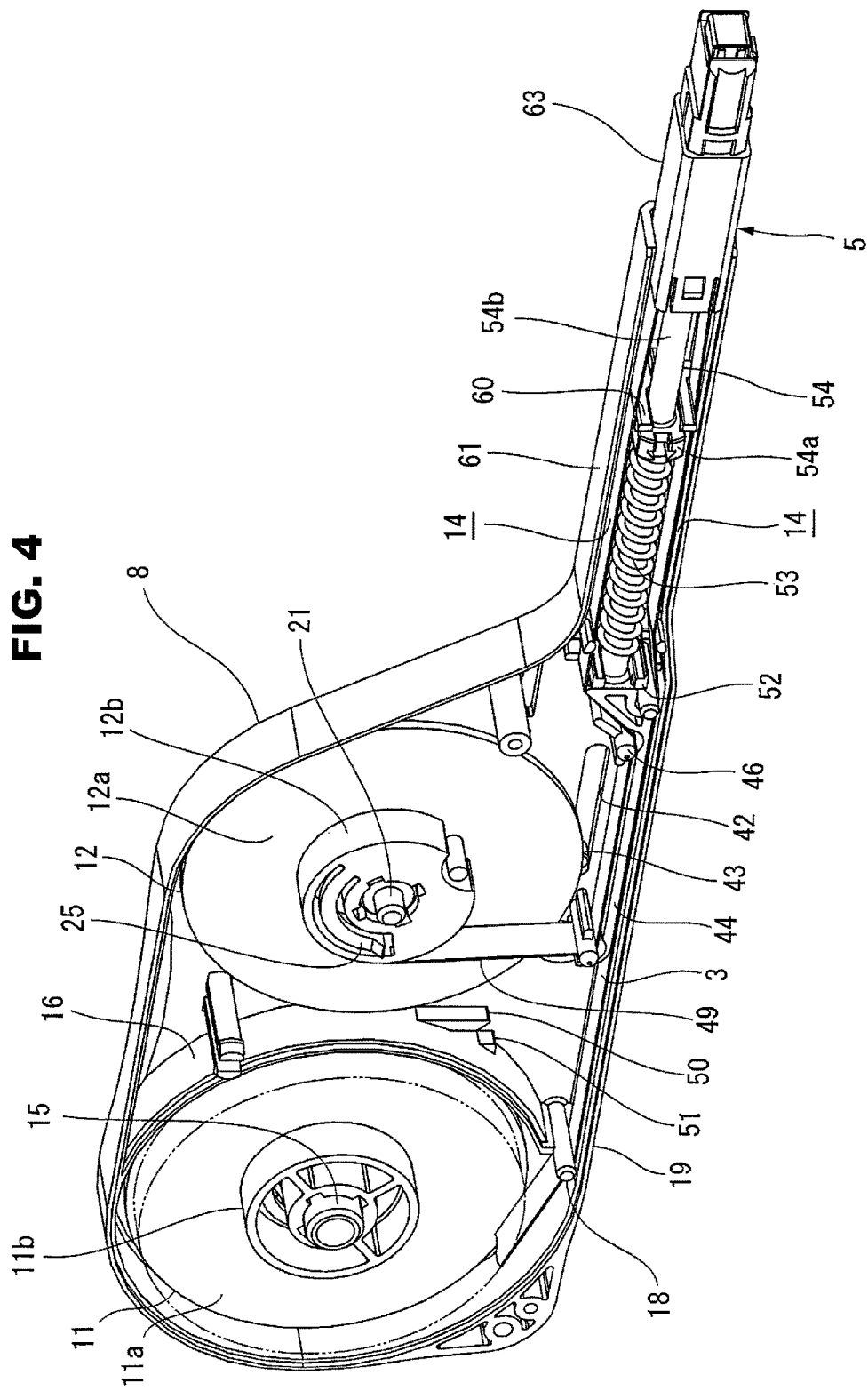
FIG. 4 is a perspective view of the optical connector cleaning tool in a state in which a left-half portion of the housing is removed from the right-half portion.

A partition plate 44 for forming the rear end portions of the cleaning cloth passages 14 is formed in the slider body 41a. As shown in FIG. 4, this partition plate forms the lower cleaning cloth passage 14 through which a clean cleaning cloth 3 pulled out from the supply reel 11 passes, in corporation with the bottom wall 19 of the housing 7.

A wall 45 for changing the moving direction of the cleaning cloth 3 and a columnar first guide pin 46 are formed in the front end portion of the slider body 41a. The wall 45 and first guide pin 46 bend the cleaning cloth 3 so that a used cleaning cloth 3 extending backward from the cleaning head 13 moves backward along the upper surface of the partition plate 44.

A second guide pin 47 for changing the moving direction of the cleaning cloth 3 and a tap tone generator 48 are formed in the rear end portion of the slider body 41a. In this embodiment, the second guide pin 47 is equivalent to a "guide" in the invention described in claim 2.

The second guide pin 47 is formed into a columnar shape, and formed in the slider body 41a so as to extend in the horizontal direction. When hooked on the second guide pin 47, the cleaning cloth 3 is bent toward the winding bobbin 12. Since the second guide pin 47 is formed in the rear end portion of the pressing member 5, the cleaning cloth 3 is pulled back by the second guide pin 47 in the vicinity of the winding bobbin 12 when the pressing member 5 retreats.

As will be described in detail below, the second guide pin 47 according to this embodiment is arranged such that a winding-side end portion 49 (see FIG. 10) of the cleaning cloth 3 extending from the second guide pin 47 to the winding bobbin 12 has a predetermined length.

The second guide pin 47 is formed in a position spaced apart from the partition plate 44 at a predetermined distance in the thickness direction of the cleaning cloth 3, and corresponding to the position of the winding bobbin 12 in the longitudinal direction.

The position of the second guide pin 47 in the longitudinal direction is determined based on the moving amount of the pressing member 5 in the longitudinal direction, and the position where the cleaning cloth 3 is wound around the winding bobbin 12.

Figure 10:
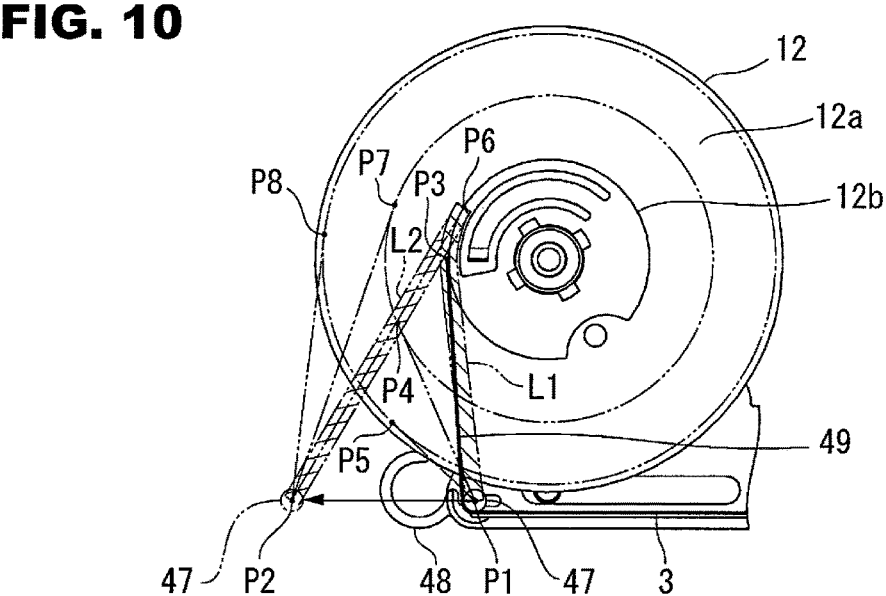
FIG. 10 is an enlarged side view showing the winding bobbin and the rear end portion of the pressing member.
Figure 19:
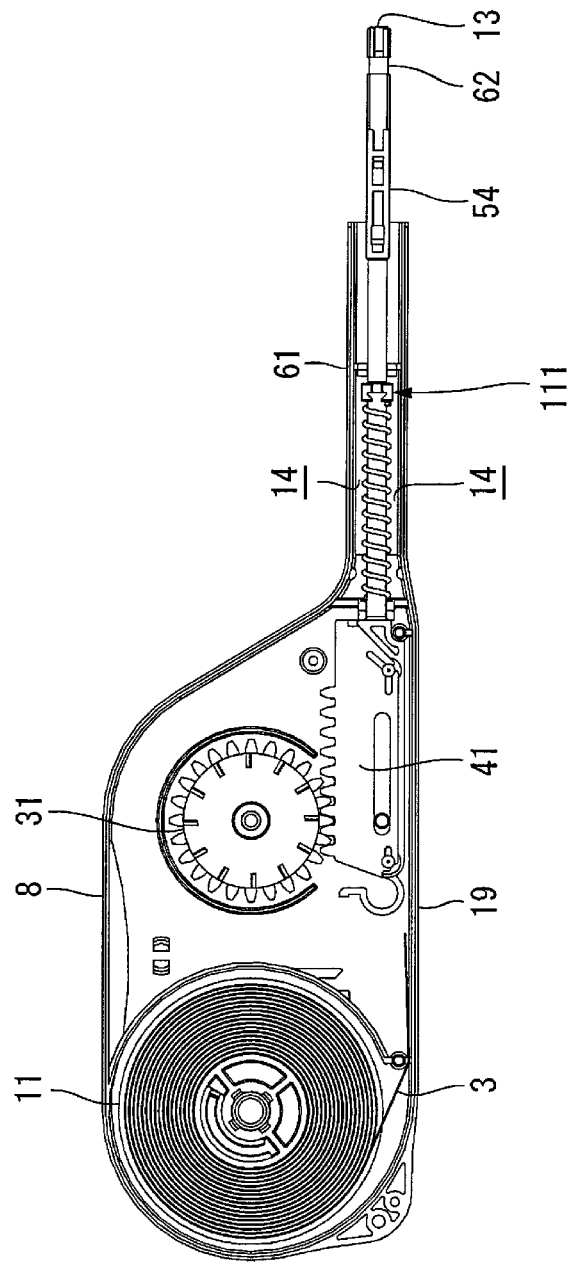
FIG. 19 is a side view showing the right-half portion of the housing and portions of a supply reel and the pressing member.

When the pressing member 5 moves in the longitudinal direction, the second guide pin 47 moves in parallel between a front position indicated by the solid line in FIG. 19 and a rear position indicated by the alternate long and two short dashed line in FIG. 10. The above-mentioned front position is a position when the pressing member 5 moves to the end portion in the projecting direction (forward). The rear position is a position when the pressing member 5 moves to the end portion in the retreating direction (backward).

The second guide pin 47 exists at a point P1 when the pressing member 5 is positioned in the front position, and exists at a point P2 when the pressing member 5 is positioned in the rear position.

The position where the cleaning cloth 3 is wound around the winding bobbin 12 moves toward the periphery of the winding bobbin 12 as the amount of cleaning cloth 3 wound around the core 12b increases. When the pressing member 5 is positioned in the front position, the position where the cleaning cloth 3 is wound around the winding bobbin 12 changes as indicated by points P3 to P5 in FIG. 10. When the pressing member 5 is positioned in the rear position, the position where the cleaning cloth 3 is wound around the winding bobbin 12 changes as indicated by points P6 to P8 in FIG. 10.

On the other hand, the length of the winding-side end portion 49 of the cleaning cloth 3 when the pressing member 5 exists in the front position differs from that when the pressing member 5 exists in the rear position. For example, when the amount of cleaning cloth 3 wound around the winding bobbin 12 is small at the start of winding or the like, this length is L1 from the point P1 to the point P6 through the point P3 when the pressing member 5 exists in the front position, and is L2 between the points P2 and P6 when the pressing member 5 exists in the rear position. In this case, length L1<length L2. Since the length of the winding-side end portion 49 thus changes, the cleaning cloth 3 is wound or slackened as the pressing member 5 moves forward or backward. The wound amount and slack amount change in accordance with the amount of cleaning cloth 3 wound around the winding bobbin 12. The second guide pin 47 according to this embodiment is arranged in a position where the wound amount and slack amount reduce as much as possible.

The wound amount and slacked amount at the start of winding will be explained with reference to FIGS. 21 and 22. The wound amount and slacked amount at the end of winding will be explained with reference to FIGS. 23 and 24.

Figure 21:
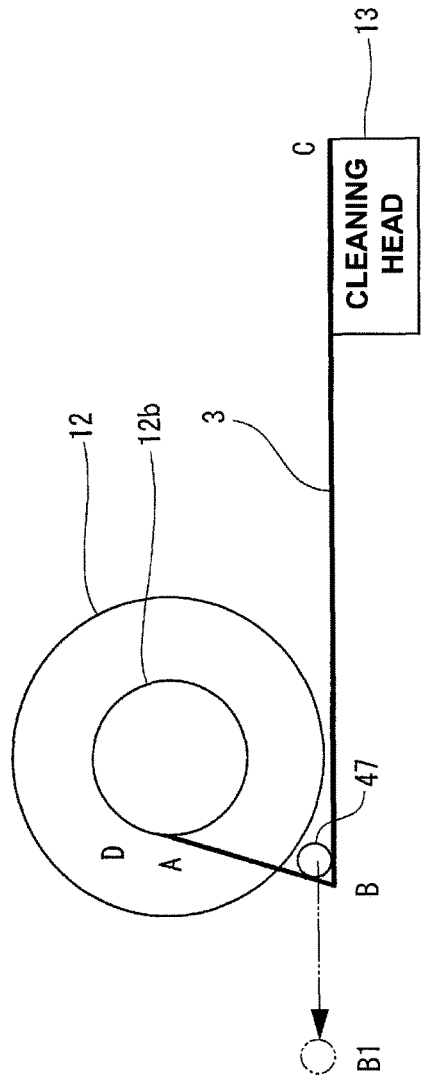
FIG. 21 is a schematic view for explaining the length of a cleaning cloth in a front position at the start of winding.
Figure 23:
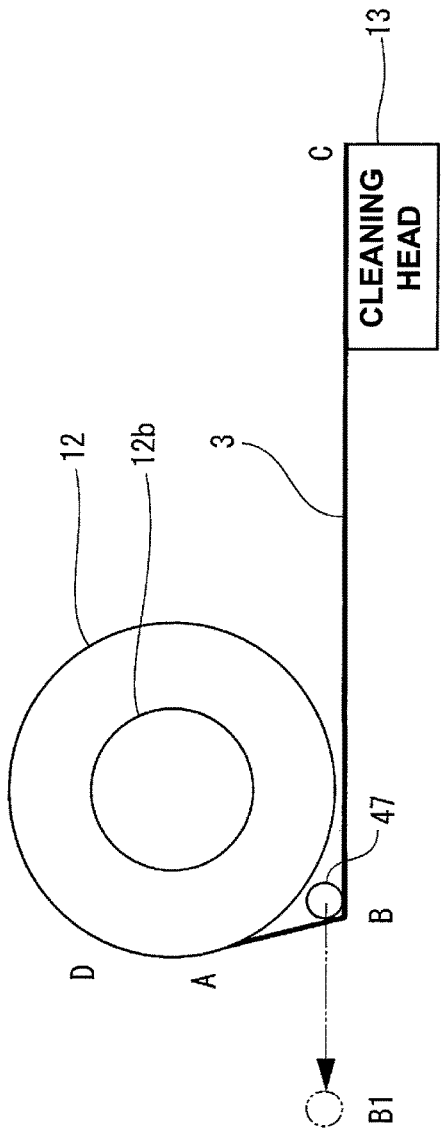
FIG. 23 is a schematic view for explaining the length of the cleaning cloth in a front position at the end of winding.
Figure 24:
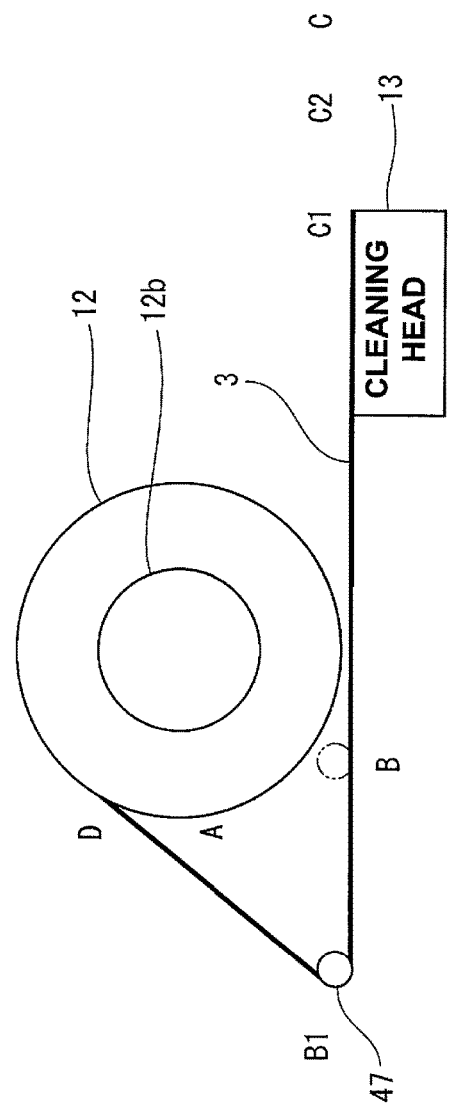
FIG. 24 is a schematic view for explaining the length of the cleaning cloth in a rear position at the end of winding.

FIG. 21 shows a state in which the pressing member 5 is positioned in the front position at the start of winding. FIG. 22 shows a state in which the pressing member 5 is positioned in the rear position at the start of winding. FIG. 23 shows a state in which the pressing member 5 is positioned in the front position at the end of winding. FIG. 24 shows a state in which the pressing member 5 is positioned in the rear position at the end of winding.

In these drawings, a point A indicates a point at which the winding-side end portion 49 of the cleaning cloth 3 leaves the winding bobbin 12 in the front position. The point A is one of the points P3 to p5 in FIG. 10. A point B indicates the position of the second guide pin 47. The point B is the point P1 in FIG. 10. A point C indicates the front end of the cleaning cloth 3 pressed against the cleaning head 13. A point D indicates a point at which the winding-side end portion 49 of the cleaning cloth 3 leaves the winding bobbin 12 in the rear position. The point D is one of the points P6 to P8 in FIG. 10. Note that when the winding bobbin 12 can freely rotate in the winding direction and opposite direction, even if the cleaning cloth 3 is fixed to the pressing member 5 at the points B and C, the point B moves to a point B1 (see FIGS. 22 and 24) and the point C moves to a point C1 (see FIGS. 22 and 24) as the pressing member 5 moves backward from the front position to the rear position. In this case, as the pressing member 5 moves forward from the rear position to the front position, the point B1 moves to the point B, and the point C1 moves to the point C.

[Start of Winding]

Figure 22:
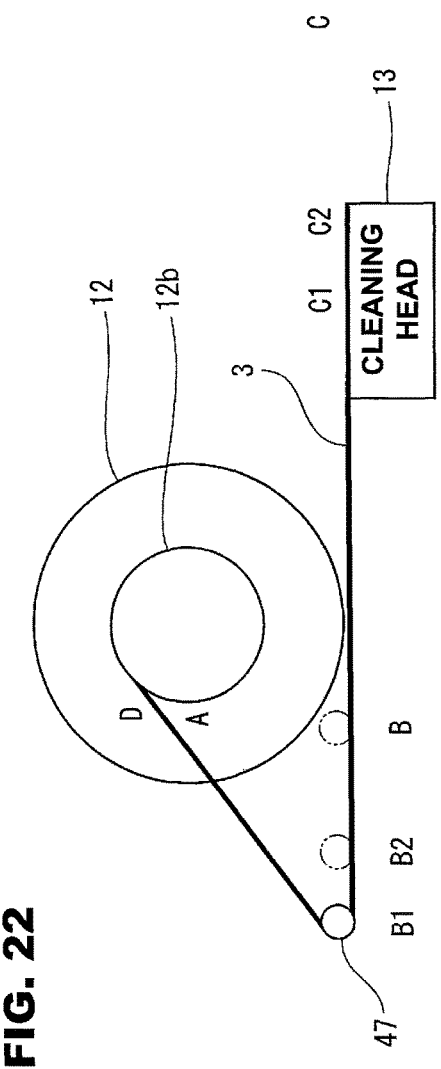
FIG. 22 is a schematic view for explaining the length of the cleaning cloth in a rear position at the start of winding.

The length of the cleaning cloth 3 between the points B and C in FIG. 21 matches that of the cleaning cloth 3 between the points B1 and C1 in FIG. 22.

In the front position shown in FIG. 21, the length (to be simply referred to as AB+AD hereinafter) of the winding-side end portion 49 from the point B to the point D through the point A is shorter than the length (to be simply referred to as B1D hereinafter) of the winding-side end portion 49 between the points B1 and D shown FIG. 22. That is, AB+AD<B1D.

(1) When Winding Bobbin 12 is Fixed

First, the start of winding will be explained by assuming that the winding bobbin 12 does not rotate.

(1a) Assuming that the cleaning cloth 3 is fixed to the pressing member 5 at the points C and B in FIG. 21 when the pressing member 5 moves backward from the front position, the point B cannot reach the point B1 because AB+AD<B1D. In this case, the point B stops in a position indicated by the point B2 in FIG. 22. For the point B of the cleaning cloth C to reach the point B1, the point C1 as the front end of the cleaning cloth 3 must move to the left until a point C2 in FIG. 22 by the length of B1D. That is, in this case, a new cleaning cloth 3 is pulled out from the supply reel 11 by the pressing member 5. In other words, practically new cleaning cloth 3 is wound. The length of the cleaning cloth 3 between the points C1 and C2 will simply be referred to as C1C2 hereinafter. In this embodiment, C1C2 is 3 mm.

(1b) After that, assuming that the cleaning cloth 3 is fixed to the pressing member 5 at the points B1 and C2 when the pressing member 5 moves forward, slack occurs between the points B, A, and D because AB+AD<B1D. Assume that this slack is 3 mm. In this case, the point C1 of the cleaning cloth 3 returns to the point C in FIG. 21.

(1c) Then, assuming that the points B and C are fixed to the pressing member 5 when the pressing member 5 moves backward, the pressing member 5 moves backward while eliminating the above-mentioned slack between the points B, A, and D. Therefore, there is no movement as explained in item (1a) above, so the point C stays at the point C1.

(1d) After that, slack always occurs in the front position because items (1b) and (1c) above are repeated.

(2) When Winding Bobbin 12 Performs Winding Action

The point D is actually not fixed but moves in the winding direction along with the winding action of the winding bobbin 12.

(2a) Winding is actually performed in the state of above-mentioned (1a). Assume that the wound amount is 10 mm. In this case, a new cleaning cloth 3 corresponding to wound amount+C1C2 is fed.

(2b) Slack occurs when the pressing member 5 moves forward from the state of above (2a).

(2c) When the pressing member 5 moves backward from the state of above (2b), the slack is eliminated by this backward movement, and the winding bobbin 12 performs winding (10 mm as described above). Accordingly, a practical winding amount of the cleaning cloth 3 is 10 mm.

(2d) After that, aforementioned items (2b) and (2c) are repeated. Consequently, a slack of 3 mm always occurs in the front position, but the feed amount of the cleaning cloth 3 is 10 mm.

[End of Winding]

The length of the cleaning cloth 3 between the points B and C in FIG. 23 matches that of the cleaning cloth 3 between the points B1 and C1 in FIG. 24.

In the front position shown in FIG. 23, the length AB+AD of the winding-side end portion 49 from the point B to the point D through the point A is longer than the length B1D of the winding-side end portion 49 between the points B1 and D shown FIG. 24. That is, AB+AD>B1D.

(3) If Winding Bobbin 12 is Fixed

First, the end of winding will be explained by assuming that the winding bobbin 12 does not rotate.

(3a) Assuming that the cleaning cloth 3 is fixed to the pressing member 5 at the points C and B in FIG. 23 when the pressing member 5 moves backward from the front position, slack corresponding to the length AB+AD occurs because AB+AD>B1D. Assume that slack {(AB+AD)−B1D} is 5.6 mm.

(3b) Then, assuming that there is no slack between the points B1 and D and the cleaning cloth 3 is fixed to the pressing member 5 at the points B1 and C1 when the pressing member 5 moves forward, the point C1 cannot return to the point C because AB+AD>B1D. That is, the point C1 stops at the point C2 which is before the point C by B1D−(AB+AD). For the point C1 to return to the point C, the point C1 must move to the right by B1D−(AB+AD)=C1C2. Therefore, practically new cleaning cloth 3 is pulled out from the supply reel 11 by the pressing member 5. In other words, new cleaning cloth 3 is wound by an amount of practically C2C. Assume that the wound amount C2C is 5.6 mm.

(3c) After that, when the pressing member 5 moves backward again while the points B and C of the cleaning cloth 3 are fixed to the pressing member 5, slack occurs in the same manner as in item (3a) above, and the wound amount of new cleaning cloth 3 reduces accordingly.

(3d) Since items (3b) and (3a) above are repeated after that, the cleaning cloth 3 is always wound in the front position.

(4) When Winding Bobbin 12 Performs Winding Action

The above-mentioned point D is actually not fixed but moves in the winding direction along with the winding action of the winding bobbin 12.

(4a) Winding is actually performed in the state of above-mentioned (3a). Assume that the wound amount is 23 mm. In this case, since 5.6 mm is used to eliminate the slack, a practical wound amount of new cleaning cloth 3 is 17.4 mm.

(4b) When the pressing member 5 moves forward from the state of (4a), new cleaning cloth 3 is wound by an amount of C2C. In this case, the wound amount is 5.6 mm.

(4c) When the pressing member 5 moves backward from the state of (4b), slack (5.6 mm) occurs. Also, the winding bobbin 12 performs winding (the wound amount is 23 mm). Since 5.6 mm is used to eliminate the slack, a practical wound amount of the cleaning cloth 3 is 17.4 mm.

(4d) After that, items (4b) and (4c) above are repeated. Accordingly, the feed amount of the cleaning cloth 3 is 17.4 mm in backward movement and 5.6 mm in forward movement.

Figure 25:
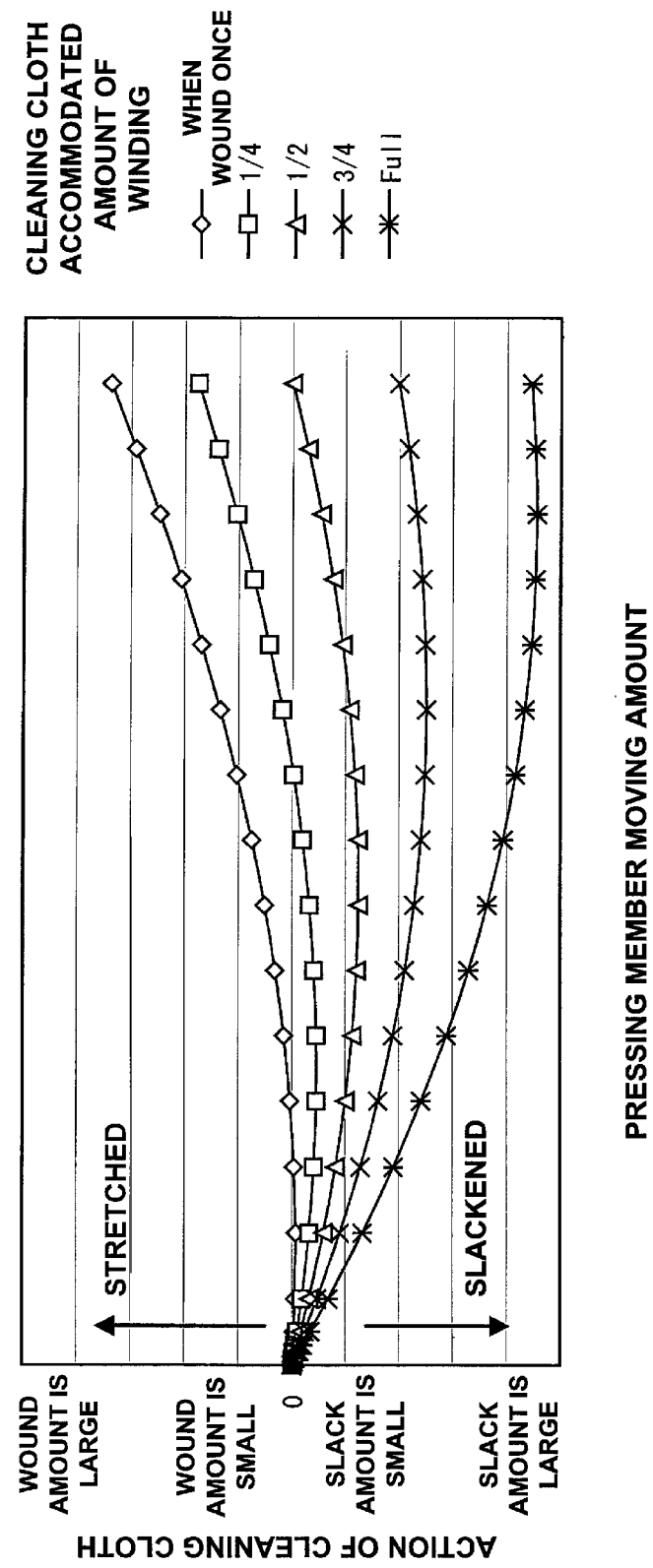
FIG. 25 is a graph for explaining the action of the cleaning cloth when the pressing member moves backward.
Figure 26:
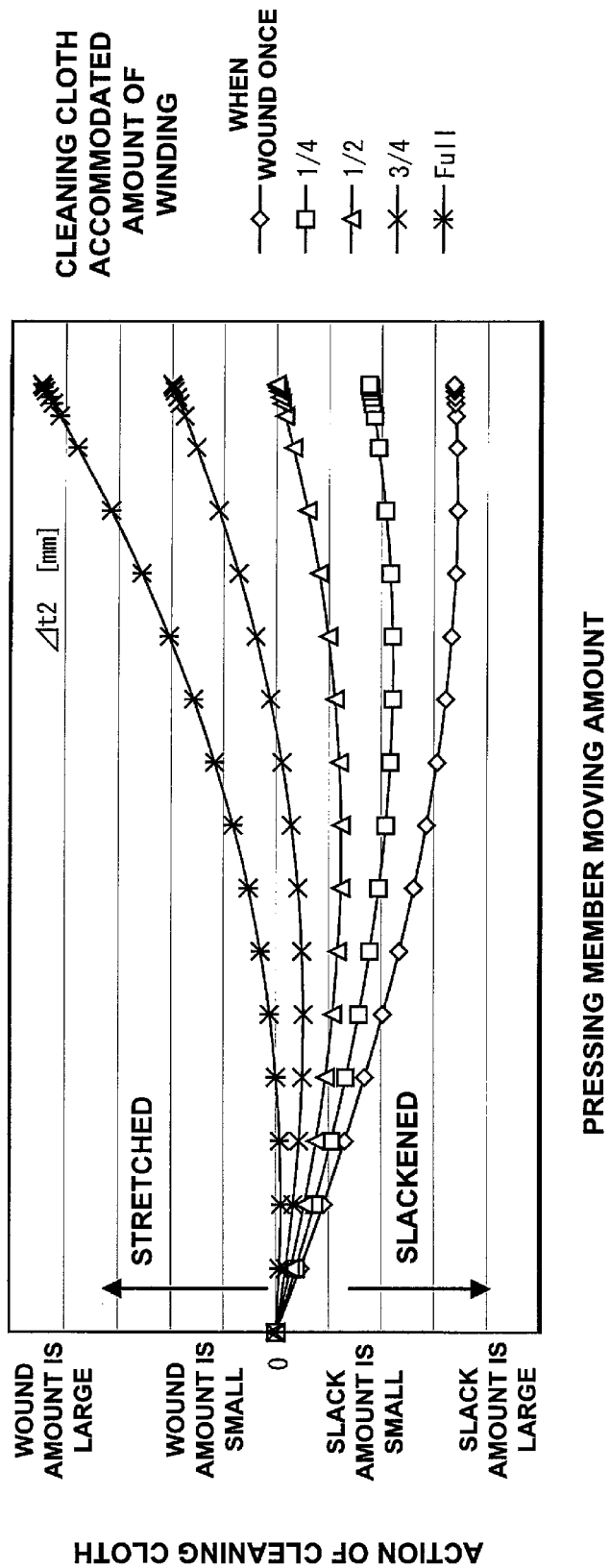
FIG. 26 is a graph for explaining the action of the cleaning cloth when the pressing member moves forward.

The wound amount and slack amount of the cleaning cloth 3 when the pressing member 5 moves backward are as shown in FIG. 25, and those of the cleaning cloth 3 when the pressing member 5 moves forward are as shown in FIG. 26.

As can be seen from FIGS. 25 and 26, the wound amount and slack amount are minimum when the amount of cleaning cloth 3 wound around the winding bobbin 12 is about 50% of the allowable accommodation amount of the winding bobbin 12. In the cleaning tool 1 according to this embodiment, therefore, the position of the second guide pin 47 is determined such that the lengths L1 and L2 of the winding-side end portion 49 are equal when the wound amount is about 50% of the allowable accommodation amount of the winding bobbin 12 (when the cleaning cloth 3 is wound around the winding bobbin 12 by an amount intermediate between the start and end of winding).

Since the second guide pin 47 is thus arranged, the cleaning cloth 3 hardly slacks along the pressing member 5 when the pressing member 5 moves backward with respect to the housing 7, and new cleaning cloth 3 is hardly pulled out from the supply reel 11 when the pressing member 5 moves forward with respect to the housing 7.

When the pressing member 5 moves backward with respect to the housing 7, the second guide pin 47 pulls the cleaning cloth 3 backward, and the transmission mechanism 33 mentioned earlier rotates the winding bobbin 12 at a predetermined rotational angle in the winding direction, thereby winding the cleaning cloth 3 around the winding bobbin 12. The aforementioned predetermined rotational angle is set at an angle by which the cleaning cloth 3 does not slack when the pressing member 5 moves backward, and the cleaning cloth 3 is fed to the cleaning head 13 by a predetermined length.

When the cleaning cloth 3 moves toward the cleaning head 13, the connection end face of an optical connector plug is cleaned as it is wiped by the cleaning cloth 3.

When the pressing member 5 moves forward with respect to the housing 7, the winding bobbin 12 stops, so the cleaning cloth 3 pulled by the second guide pin 47 is returned, and a shortage of the cleaning cloth 3 is pulled out from the supply reel 11.

As shown in FIG. 6, the tap tone generator 48 includes an elastic deformation portion 48a having a C shape when viewed sideways, and a projecting piece 48b projecting upward from the elastic deformation portion 48a. The tap tone generator 48 is so positioned as to sequentially abut against first and second projections 50 and 51 (see FIGS. 3 and 4) formed in the right-half portion 8 of the housing 7 when the pressing member 5 moves backward.

When the pressing member 5 moves backward, the projecting piece 48b abuts against the first projection 50. The first projection 50 is formed so that only the distal end portion of the projecting piece 48b abuts against the partition 16. When the pressing member 5 further moves backward in the state in which the projecting piece 48b abuts against the first projection 50, the elastic deformation portion 43a warps, and the projecting piece 48b goes over the first projection 50 and collides against the second projection 51. A tap tone is generated when the projecting piece 48b collides against the second projection 51, so the user can be notified that the pressing member 5 has moved backward to the rear end.

As shown in FIG. 9, the guide rod 41b of the slider 41 is formed into the shape of a column. Also, as shown in FIG. 4, the guide rod 41b extends through a read-side support seat 52 of the housing 7 in the longitudinal direction, and is supported by the rear-side support seat 52 so as to be movable in the longitudinal direction. As shown in FIG. 3, the rear-side support seat 52 is formed into a horizontal U shape when viewed from the front in the right-half portion 8 of the housing 7. The left-half portion 9 of the housing 7 closes an open portion of the rear-side support seat 52.

The guide rod 41b is passed through the axis of a slide spring 53 formed by a compressed coil spring. The slide spring 53 is inserted between a head push base 54 connected to the front end portion of the guide rod 41b and the rear-side support seat 52, and biases the head push base 54 forward.

The head push base 54 forms an intermediate portion of the pressing member 5, and includes an engaging element 54a which engages with the front end portion of the guide rod 41b, a columnar spindle 54b extending forward from the engaging element 54a, and a support member 54c formed at the front end of the spindle 54b.

A connecting portion between the engaging element 54a and guide rod 41b is so formed that the guide rod 41b can be assembled to the engaging element 54a in the horizontal direction. A horizontally extending notch 55 is formed in the front end portion of the guide rod 41b according to this embodiment. A pawl 56 which fits in the notch 55 is formed on the engaging element 54a.

Figure 11:
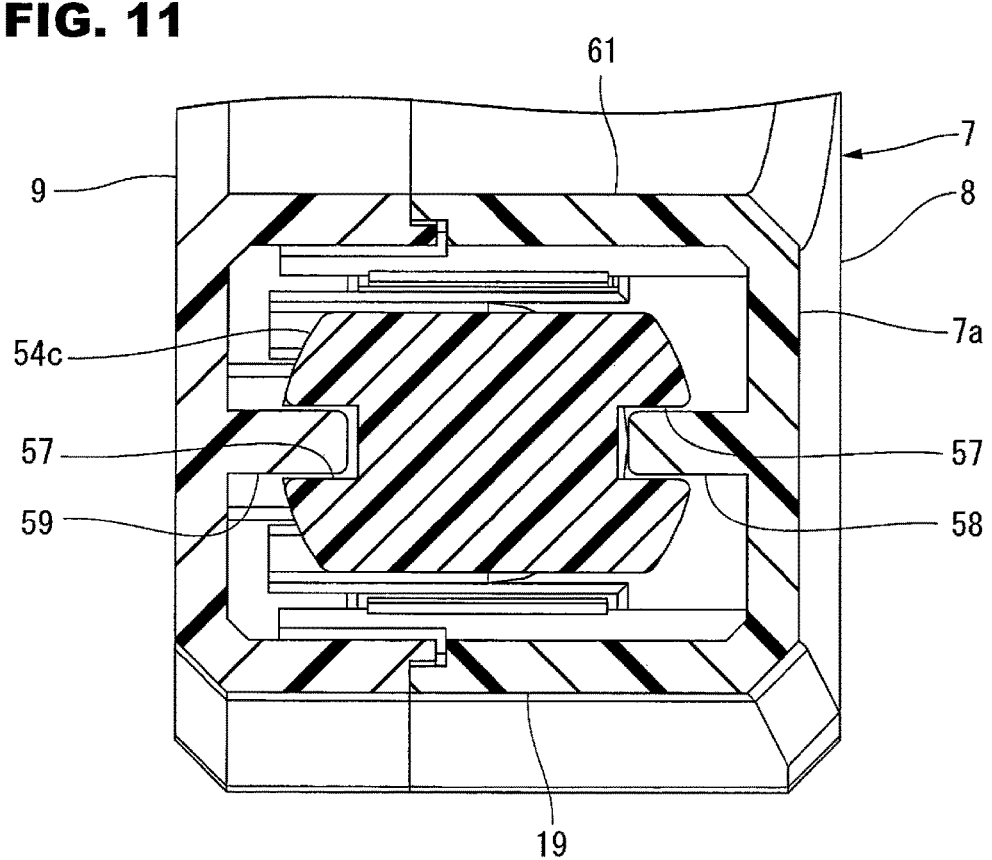
FIG. 11 is a cutaway sectional view showing a portion where an engaging element of a head push base fits in the housing.

As shown in FIG. 11, notches 57 are formed in the two end portions of the engaging element 54a in the horizontal direction. The notches 57 are fitted in a guide rail 58 formed in the right-half portion 8 (see FIG. 3) of the housing 7 and a guide rail 59 formed in the left-half portion 9 (see FIG. 5) of the housing 7 so as to be movable in the longitudinal direction.

As shown in FIG. 4, the spindle 54b extends through a front-side support seat 60 of the housing 7 in the longitudinal direction, and is supported by the front-side support seat 60 so as to be movable in the longitudinal direction. As shown in FIG. 3, the front-side support seat 60 is formed into a horizontal U shape when viewed from the front in the right-half portion 8 of the housing 7. The left-half portion 9 of the housing 7 closes an open portion of the front-side support seat 60.

The front-side support seat 60 and the rear-side support seat 52 mentioned earlier are so formed as to be spaced apart from the bottom wall 19 and an upper wall 61 of the housing 7 by a distance equal to or larger than the thickness of the cleaning cloth 3. The aforementioned cleaning cloth passages 14 are so formed that the cleaning cloth 3 can pass between the bottom wall 19 and the rear-side support seat 52 and front-side support seat 60, and between the upper wall 61 and the rear-side support seat 52 and front-side support seat 60. That is, as shown in FIG. 4, the cleaning cloth passages 14 are open toward the (left) side in a state in which the left-half portion 9 of the housing 7 is removed from the right-half portion 8.

The engaging element 54a of the head push base 54 is positioned backward by the front-side support seat 60. That is, when the head push base 54 is pushed backward with respect to the housing 7, the engaging element 54a pushes the front end of the slid spring 53 backward, so the slide spring is compressed between the engaging element 54a and rear-side support seat 52. The head push base 54 moves in the longitudinal direction together with the slider 41 connected to the rear side, and a head push 62 (to be described later), a head cover 63 (to be described later), and the cleaning head 13 formed on the front side. The head push base 54 and the plurality of members which move together with the head push base 54 form the pressing member 5.

The pressing member 5 is moved backward with respect to the housing 7 against the spring force of the slide spring 53. After that, the work is complete, the force of pressing the cleaning tool against the connector is lost, and the force of moving the pressing member 5 backward is lost. Consequently, the pressing member 5 is moved forward with respect to the housing 7 by the spring force of the slide spring 53, and returned to the initial position. This forward movement of the pressing member 5 is regulated when the wall 45 of the slider 41 abuts against the rear-side support seat 52 from behind.

The support member 54c of the head push base 54 is formed into a rectangular shape which is long in the longitudinal direction when viewed from the front. A pair of flat surfaces 64 forming portions of the passage walls of the cleaning cloth passages 14 are formed in the two end portions of the support member 54c in the thickness direction (the vertical direction in FIG. 9) of the cleaning cloth 3.

Figure 12:
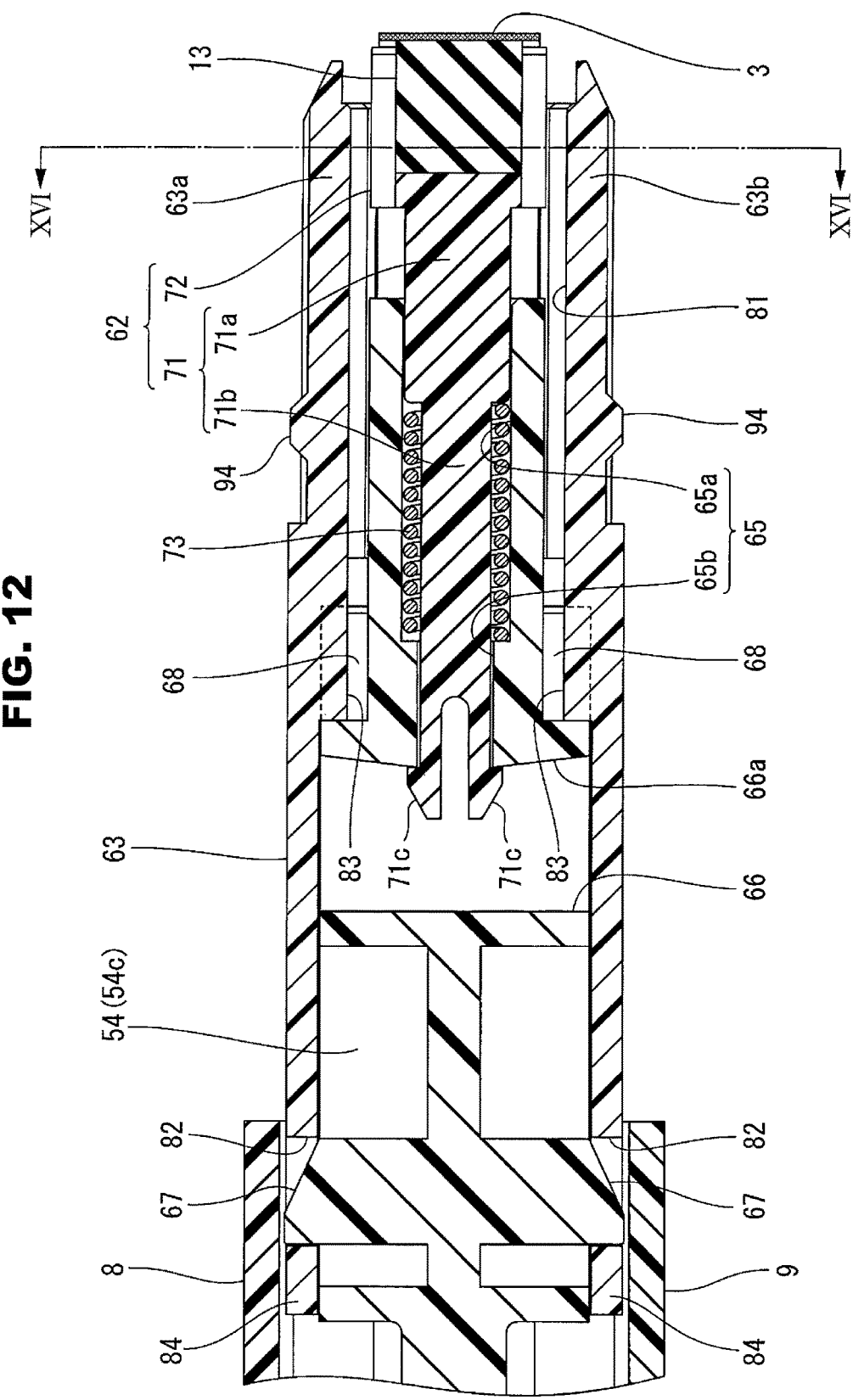
FIG. 12 is a cross sectional view of the front end portion of the housing and the pressing member, in which a line XVI-XVI indicates a cutaway position shown in FIG. 16.

As shown in FIG. 12, a shaft hole 65 for supporting the head push 62 (to be described later) is formed in the front end portion of the support member 54c. The shaft hole 65 includes a large-diameter portion 65a positioned on the front side, and a small-diameter portion 65b positioned on the rear side of the large-diameter portion 65a. The large-diameter portion 65a opens to the front end face of the support member 54c. The small-diameter portion 65b extends backward in the support member 54c from the large-diameter portion 65a, and opens to a lateral hole 66 of the support member 54c.

As shown in FIG. 9, projections 67 and guide grooves 68 are formed in the two end portions of the support member 54c in the horizontal direction. The projections 67 are used to fix the head cover 63 (to be described later) to the support member 54c, and formed in the rear end portion of the support member 54c so as to project sideways. The front surface of each projection 67 is inclined so that the projection amount of the projection gradually increases backward.

The guide grooves 68 are used to support the front end portion of the head cover 63 (to be described later). The guide grooves 68 open forward and in the horizontal direction.

As shown in FIG. 12, the support member 54c is accommodated in the head cover 63 (to be described later).

The head push 62 forms the front end portion of the pressing member 5, and includes a connecting shaft 71 to be inserted into the shaft hole 65 of the head push base 54, and a holder 72 formed at the front end of the connecting shaft 71.

As shown in FIGS. 9 and 12, the connecting shaft 71 includes a columnar portion 71a positioned on the front side, a small-diameter portion 71b extending backward from the columnar portion 71a, and a pair of locking pieces 71c formed in the rear end portion of the small-diameter portion 71b. The columnar portion 71a is formed into a shape which movably fits in the large-diameter portion 65a of the shaft hole 65.

The small-diameter portion 71b is formed into a shape which can be inserted into the small-diameter portion 65b of the shaft hole 65. The pair of locking pieces 71c are formed into a shape which can be pushed into the small-diameter portion 65b from the front. The locking pieces 71c return to the initial shape when coming out from the small-diameter portion 65b into the lateral hole 66, and are locked by a front wall 66a of the lateral hole 66. When the connecting shaft 71 is inserted into the shaft hole 65, the head push 62 is supported by the head push base 54 so as to be movable in the longitudinal direction (the direction parallel to the moving direction of the pressing member 5).

A head push spring 73 is inserted behind the columnar portion 71a in the large-diameter portion 65a of the shaft hole 65. The head push spring 73 is formed by a compressed coil spring, and biases the head push 62 forward with respect to the head push base 54. That is, the head push 62 can move backward with respect to the head push base 54 against the spring force of the head push spring 73.

When the backward pushing force is lost, the head push 62 is returned to the initial position by the spring force of the head push spring 73. The head push spring 73 generates a spring force of 5N to 9N when the head push 62 moves backward with respect to the head push base 54. The slide spring 53 described above has a spring force larger than that of the head push spring 73. That is, the pressing member 5 does not move backward with respect to the housing 7, but the head push 62 moves backward with respect to the head push base 54.

Figure 13:
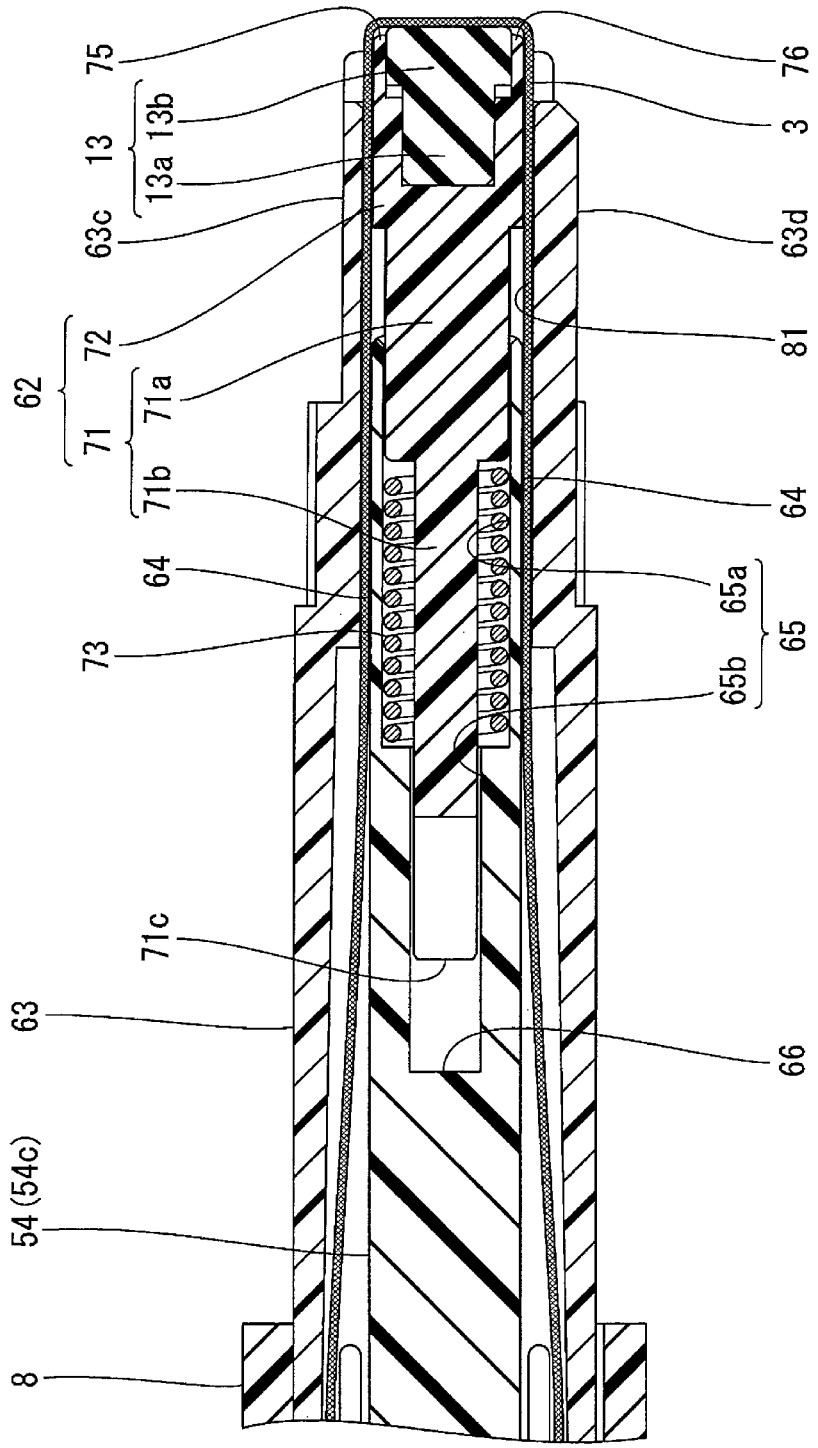
FIG. 13 is a longitudinal sectional view of the front end portion of the housing and the pressing member.
Figure 14:
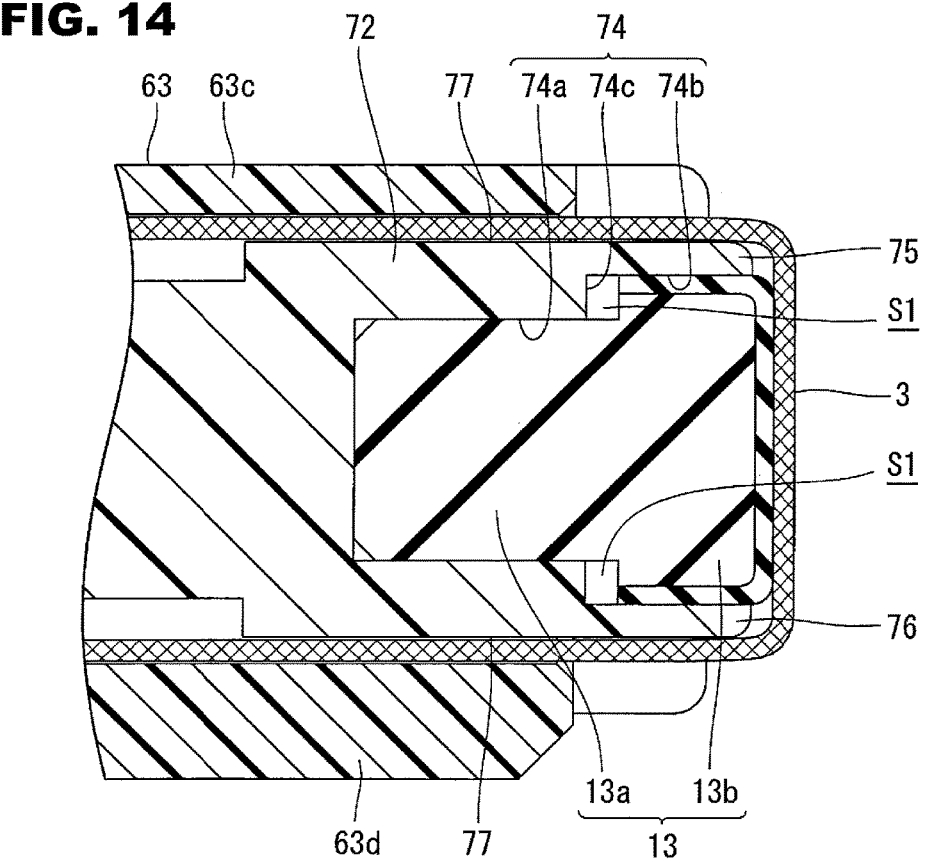
FIG. 14 is an enlarged sectional view showing the front end portion of the pressing member.

The holder 72 of the head push 62 holds the cleaning head 13 such that the cleaning head 13 projects to the front end portion of the head push 62. As shown in FIGS. 13 and 14, a recess 74 which opens forward and holds the cleaning head and first and second walls 75 and 76 are formed in the holder 72. The pair of first and second walls 75 and 76 according to this embodiment also function as the inner walls of the recess 74.

The cleaning head 13 is formed into a predetermined shape by using an elastic material made of rubber. As shown in FIG. 13, the shape of the cleaning head 13 according to this embodiment is a T shape when viewed in the widthwise direction of the cleaning cloth 3. That is, the cleaning head 13 includes a longitudinal bar 13a extending in the longitudinal direction of the T shape, and a lateral bar 13b extending in the lateral direction of the T shape. The cleaning head 13 is held as it is fitted in the recess 74 such that the lateral bar 13*b* is positioned on the front-end side.

A surface portion of the cleaning head 13, which comes in contact with the cleaning cloth 3, includes the front surface and the two end faces in the vertical direction of the lateral bar 13*b*. This surface portion is so processed as to have a higher hardness and lower frictional resistance than those of a rubber material forming other portions.

As shown in FIG. 14, the recess 74 of the holder 72 includes a rear-side recess 74*a* in which the longitudinal bar 13*a* of the cleaning head 13 fits, and a front-side recess 74*b* in which the lateral bar 13*b* fits. The front-side recess 74*b* is formed to be deeper than the lateral bar 13*b*. A space S1 having a predetermined width is formed between a bottom surface 74*c* of the front-side recess 74*b* and the lateral bar 13*b*.

As shown in FIG. 14, the pair of first and second walls 75 and 76 are so formed as to sandwich the cleaning head 13 fitted in the recess 74 from the both sides in the vertical direction (the direction perpendicular to the longitudinal direction when viewed in the widthwise direction of the cleaning cloth 3). The first and second walls 75 and 76 hold the lateral bar 13*b* of the cleaning head 13 from the above-mentioned two sides. Flat surfaces 77 parallel to the flat surfaces 64 of the support member 54*c* are formed in the end portions of the first and second walls 75 and 76, which are opposite to the cleaning head 13.

The flat surfaces 77 formed on the pair of first and second walls 75 and 76 form portions of the passage walls of the cleaning cloth passages 14 like the flat surfaces 64 of the support member 54*c*. As shown in FIG. 13, the cleaning cloth 3 extends forward along the flat surfaces 64 of the support member 54*c* and the flat surfaces 77 of the holder 72, bends beyond the front ends of the first and second walls 75 and 76, and comes in contact with the front surface of the cleaning head 13.

When one end of the cleaning cloth 3 is wound around the winding bobbin 12, the cleaning cloth 3 vertically moves along the lateral bar 13*b* of the cleaning head 13. The lateral bar 13*b* in contact with the cleaning cloth 3 elastically deforms so as to be displaced in the moving direction of the cleaning cloth 3 due to friction with the cleaning cloth 3, and is urged against one of the pair of first and second walls 75 and 76, which is positioned on the downstream side in the feeding direction of the cleaning cloth 3. This elastic deformation of the lateral bar 13*b* is regulated when the lateral bar 13*b* is urged against the above-mentioned wall.

The head cover 63 covers the support member 54*c* of the head push base 54 and the head push 62, and forms the cleaning cloth passages 14 on the two sides of these members in the vertical direction. As shown in FIG. 9, the head cover 63 is formed into a square shape which is elongate in the longitudinal direction. As shown in FIG. 13, a through hole 81 as a hollow portion of the head cover 63 is so formed as to produce a space which allows the cleaning cloth 3 to pass between the support member 54*c* of the head push base 54 and the head push 62 while these members are inserted. This space forms portions of the cleaning cloth passages 14. In this embodiment, the through hole 81 of the head cover 63 is equivalent to a "hole into which said head push is inserted" in claims 9 and 10.

The support member 54*c* and head push 62 are inserted into the head cover 63 from its rear end in a state in which the cleaning cloth 3 is extended along these members.

Figure 15:
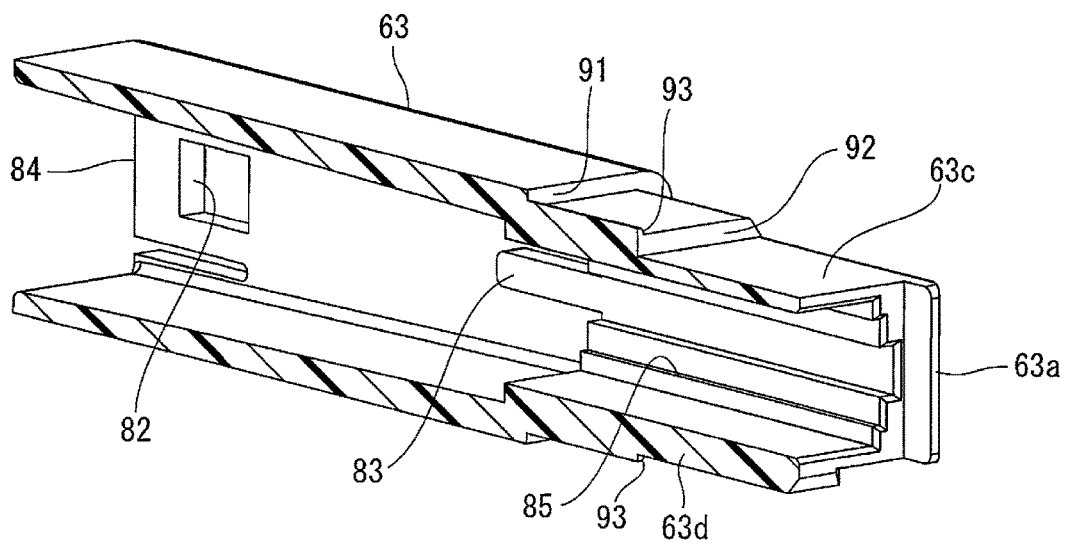
FIG. 15 is a longitudinal sectional view of a head cover.

The rear portion of the head cover 63 is so formed as to fit in the support member 54*c* in only the widthwise direction (horizontal direction) of the cleaning cloth 3. As shown in FIGS. 9 and 15, this fitting portion has a hole 82 in which the projection 67 of the support member 54*c* fits, and a projecting piece 83 which fits in the guide groove 68 (see FIG. 9) of the support member 54*c*.

The hole 82 is formed in a plate 84 which is formed in a cantilever manner in the rear end portion of the head cover 63. When the support member 54*c* is inserted into the head cover 63 from behind, the projection 67 of the support member 54*c* moves forward while slightly elastically deforming the plate 84 outward, and is locked as it is fitted in the hole 82 from inside the head cover 63. Also, when the support member 54*c* is inserted into the head cover 63 from behind, the projecting piece 83 fits in the guide groove 68 of the support member 54*c* from the front. The locking portion including the projection 67 and hole 82 and the fitting portion including the guide groove 68 and projecting piece 83 regulate the vertical and horizontal movements of the head cover 63 with respect to the support member 54*c*. The fitting portion also regulates the change in vertical space between the front end portion of the head cover 63 and the first and second walls 75 and 76 of the holder 72.

As shown in FIG. 15, guide grooves 85 extending in the longitudinal direction are formed inside the front end portion of the head cover 63. The guide grooves 85 are respectively formed in sidewalls 63*a* and 63*b* positioned in the two end portions of the head cover 63 in the horizontal direction. The guide grooves 85 are so formed that projecting portions 86 (see FIG. 9) formed in the two side portions of the support member 54*c* and projecting portions 87 (see FIG. 9) formed in the two side portions of the holder 72 can movably fit in the longitudinal direction.

Figure 16:
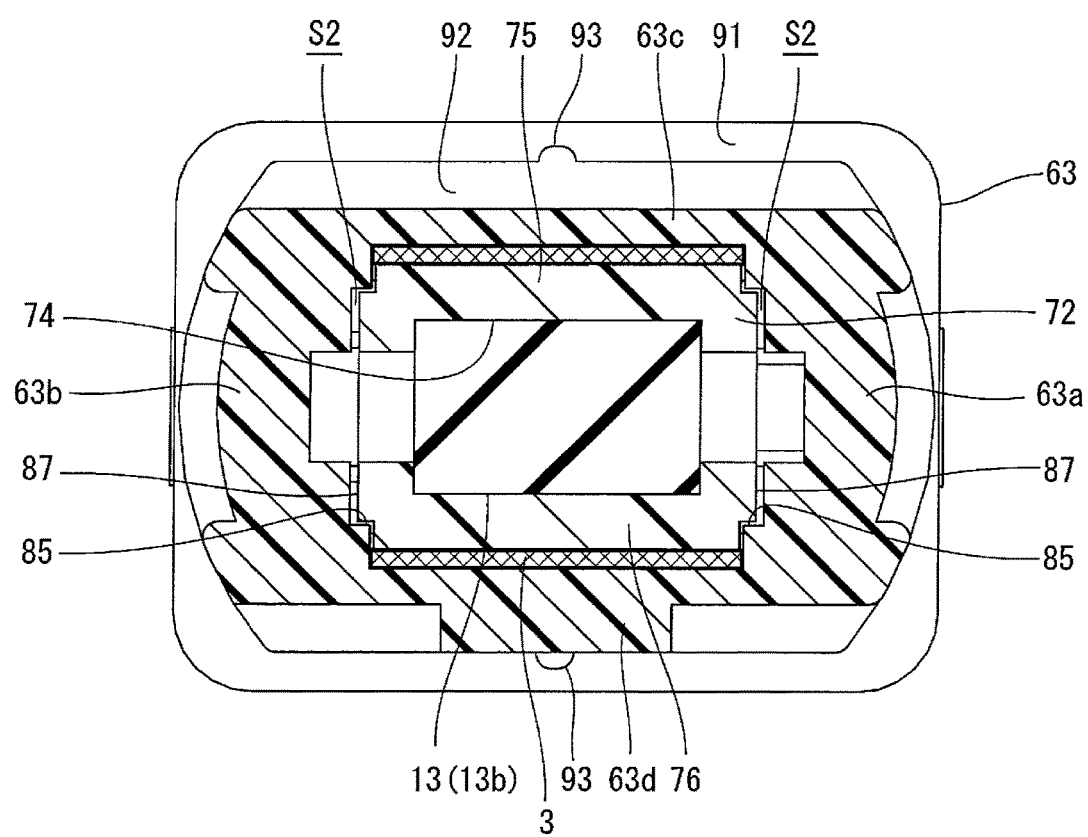
FIG. 16 is a sectional view taken along the line XVI-XVI shown in FIG. 12.

That is, as shown in FIG. 16, the two sidewalls 63*a* and 63*b* of the head cover 63 are so formed that the holder 72 of the head push 62 and the support member 54*c* (not shown) positioned behind the holder 72 can fit. Therefore, a space S2 is formed between the two end portions in the horizontal direction of the holder 72 of the head push 62 and the wall surface of the through hole 81 of the head cover 63, which opposes the two end portions, and the space S2 allows the head push 62 to be inserted into the head cover 63.

As shown in FIG. 15, two other walls of the head cover 63, i.e., walls 63*c* and 63*d* opposing the cleaning cloth 3 are so formed as to extend forward to the same positions as the front ends of the guide grooves 85 in the longitudinal direction. As shown in FIG. 14, therefore, the distal ends (front ends) of the two walls 63*c* and 63*d* are positioned near the distal end of the head push 62 (the holder 72).

The outer portion of the front end portion of the head cover 63 is so formed that the cap 6 (to be described later) and an optical connector adaptor (not shown) can be attached. That is, as shown in FIG. 9, a first abutting surface 91, second abutting surfaces 92, ribs 93, and locking projections 94 are formed in the front end portion of the head cover 63. In this embodiment, the first and second abutting surfaces 91 and 92 form an "portion" in the invention described in claim 6.

The first abutting surface 91 positions the cap 6 in the longitudinal direction with respect to the head cover 63. The first abutting surface 91 is formed as a flat surface pointing to the front. As shown in FIG. 16, an outer shape when the head cover 63 is viewed from the front is an almost quadrangle. The first abutting surface 91 is so formed as to extend along the four sides of this quadrangle.

The second abutting surfaces 92 position an optical connector adaptor in the longitudinal direction with respect to the head cover 63. The second abutting surfaces 92 are formed on only the two walls 63*c* and 63*d* of the head cover 63, which oppose the cleaning cloth 3. The second abutting surfaces 92 are positioned on the front side of the first abutting surface 91. Although not shown, when an optical connector adaptor is attached to the head cover 63, the second abutting surfaces 92 abut against the rear end face of the optical connector adaptor. In this state in which the rear end face of the optical connector adaptor is abutting against the second abutting surfaces 92, the optical connector adaptor is positioned in the longitudinal direction with respect to the head cover 63.

The ribs 93 increase the frictional resistance when attaching the cap 6 to the head cover 63. The ribs 93 are so formed as to extend in the longitudinal direction between the first and second abutting surfaces 91 and 92 on the two walls 63c and 63d.

The locking projections 94 position and fix the cap 6. The locking projections 94 are formed on the sidewalls 63a and 63b of the head cover 63.

Figure 17:
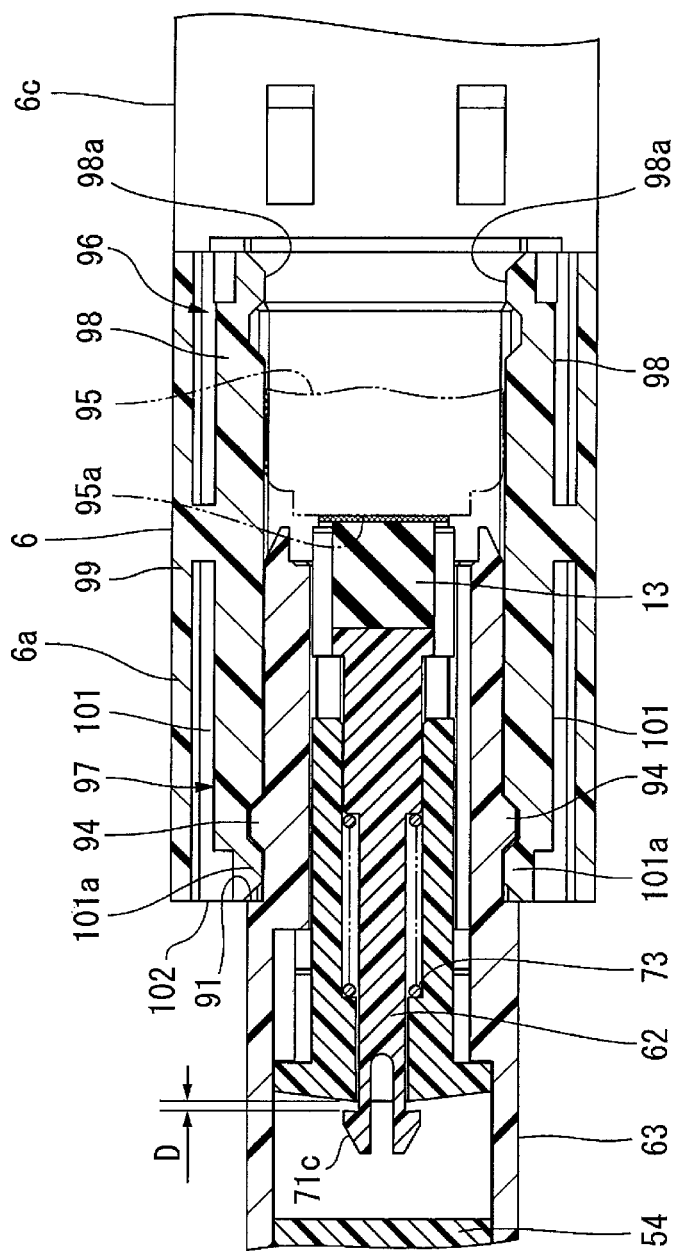
FIG. 17 is a cross sectional view of a cap, and shows a state in which the cap is connected to the optical connector cleaning tool.
Figure 18:
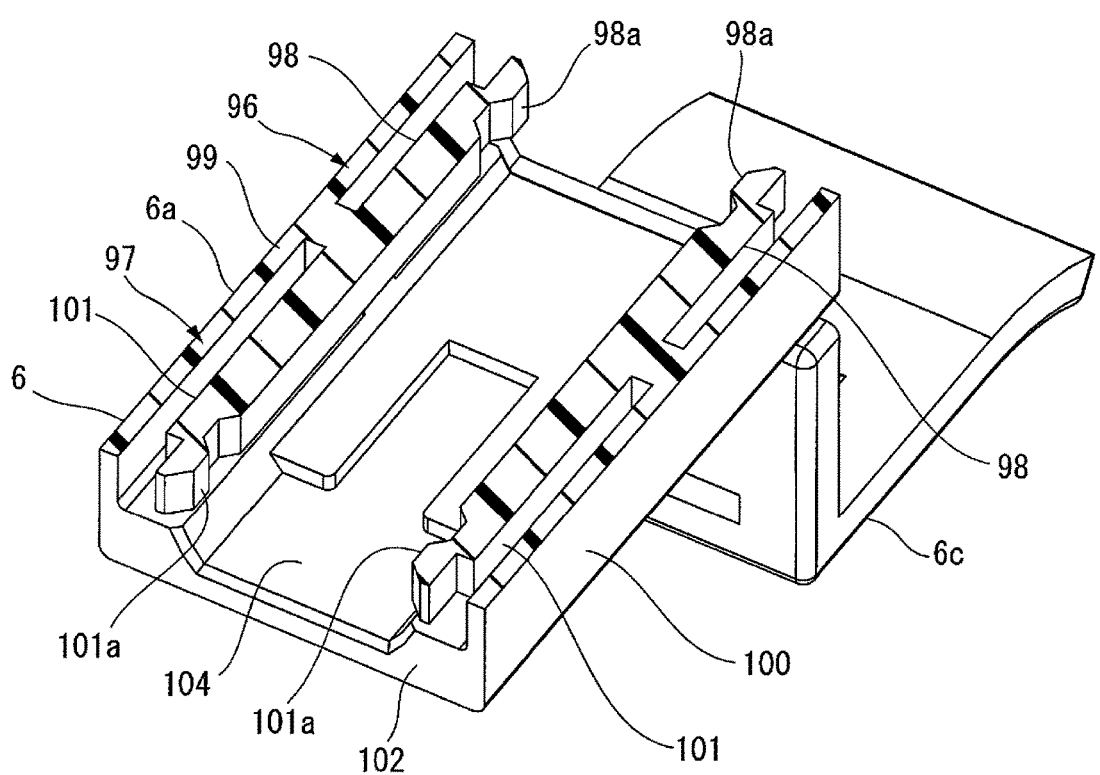
FIG. 18 is a cutaway perspective view showing the cap.

As shown in FIG. 2, the cap 6 includes a cylindrical member 6a, and a cover member 6c connected to the front end portion of the cylindrical member 6a via a hinge 6b. The front end portion of the pressing member 5 and an optical connector plug 95 (see FIG. 17) are inserted into the hollow portion of the cylindrical member 6a. As shown in FIGS. 17 and 18, the cylindrical member 6a includes an optical connector plug connecting portion 96 positioned at one end, and a cleaning tool connecting portion 97 positioned at the other end.

The optical connector plug connecting portion 96 includes optical connector plug locking pieces 98. The optical connector plug locking pieces 98 hold the optical connector plug (see FIG. 17) in the cap 6. The optical connector plug locking pieces 98 are formed on sidewalls 99 and 100 positioned on the two sides of the cylindrical member 6a in the horizontal direction, and include pawls 98a to be locked by the two side portions of the optical connector plug 95.

When locked to the two side portions of the optical connector plug 95, the optical connector plug locking pieces 98 according to this embodiment have a function of vertically and horizontally positioning the optical connector plug 95 with respect to the cap 6, and a function of preventing removal in the longitudinal direction. Also, the optical connector plug locking pieces 98 are so formed as to have a length equal to that of optical connector plug locking pieces (not shown) formed in an optical connector adaptor to which the optical connector plug 95 is to be connected.

The cleaning tool connection portion 97 includes cleaning tool locking pieces 101. The cleaning tool locking pieces 101 fix the cap 6 to the head cover 63. The cleaning tool locking pieces 101 are formed on the sidewalls 99 and 100 of the cylindrical member 6a, and include pawls 101a to be locked to the projections 94 of the head cover 63 in a state in which the front end portion of the head cover 63 is inserted into the cylindrical member 6a from behind.

When locked to the projection 94 of the head cover 63, the cleaning tool locking pieces 101 according to this embodiment have a function of vertically and horizontally positioning the cap 6 with respect to the head cover 63, and a function of preventing removal in the longitudinal direction.

As shown in FIG. 17, the cleaning tool locking pieces 101 are locked over the projections 94 on the head cover side surfaces in a state in which the read end face 102 of the cap 6 is abutting against the first abutting surface 91 of the head cover 63. The rear end face 102 of the cap 6 and the read end face (not shown) of the optical connector adaptor form a "portion to be abutted" in the invention described in claim 6.

The cleaning tool locking pieces 101 are formed to be longer than the optical connector plug locking pieces 98 in the longitudinal direction.

Two walls 103 and 104 of the cylindrical member 6a on which the cleaning tool locking pieces 101 are not formed are so formed as to abut against the first abutting surface 91 while elastically deforming the ribs 93 when the head cover 63 is inserted into the cylindrical member 6a.

The positions of the first abutting surface 91 and the projections 94 of the head cover 63 in the longitudinal direction are determined based on the position in the longitudinal direction of the optical connector plug 95 held in the cap 6.

As shown in FIG. 17, the positions of the first abutting surface 91 and projections 94 are set in positions where the cleaning head 13 is pressed against a connection end face 95a of the optical connector plug 95 with the cleaning cloth 3 being interposed between them in a connected state in which the first abutting surface 91 is abutting against the read end face 102 of the cap 6. In this connected state, the cleaning head 13 pushes the head push 62 backward. The head push 62 pushed by the cleaning head 13 moves backward against the spring force of the head push spring 73.

That is, the positions of the first abutting surface 91 and projections 94 in the longitudinal direction are set in positions where the head push 62 moves backward with respect to the head cover 63 by a predetermined length D in the above-mentioned connected state. In this connected state, the spring force of the head push spring 73 presses the cleaning cloth 3 against the connection end face 95a.

The connection end face 95a of a stand-alone optical connector plug is performed by the user by moving the housing 7 forward with respect to the cap 6 in the aforesaid connected state. When the housing 7 moves forward with respect to the cap 6, the head cover 63 is pushed backward by the cap 6, and moves backward with respect to the housing 7 against the spring force of the slide spring 53. In this backward movement, the cleaning head 13 is biased by the head push spring 73 and keeps pressing the cleaning cloth 3 against the connection end face 95a with a predetermined pressing force (e.g., 5N to 9N).

When cleaning an optical connector plug already attached in an optical fiber cable connection port of an electronic apparatus, although not shown, the positions of the second abutting surfaces 92 are set in positions where the cleaning head 13 is pressed against the connection end face of the optical connector plug with the cleaning cloth 3 being interposed between them in a connected state in which the second abutting surfaces 92 are abutting against the read end face of the optical connector adaptor. In this connected state, the head push 62 moves backward with respect to the head cover 63 by the predetermined length D, and the cleaning head 13 is pushed by the spring force of the head push spring 73 and presses the cleaning cloth 3 against the connection end face.

The cover member 6c of the cap 6 is so formed as to be able to close the front-end opening of the cylindrical member 6a by bending the hinge 6b. When the cap 6 whose opening is closed by the cover member 6c is attached to the front end portion of the head cover 63, the cleaning cloth 3 and the openings of the cleaning cloth passages 14 are covered with the cap 6.

The optical connector cleaning tool 1 configured as described above is assembled following the procedure below. First, as shown in FIG. 19, the supply reel 11 and bobbin rotating gear 31 are assembled to the right-half portion 8 of the housing 7. On the other hand, one part assembly 111 is formed by assembling the parts of the pressing member 5 except for the head cover 63. The part assembly 111 is then attached to the right-half portion 8. When these parts are attached to the right-half portion 8, the cleaning cloth passages 14 are formed between the part assembly 111 and the bottom wall 19 and upper wall 61 of the right-half portion 8.

Subsequently, the cleaning cloth 3 is pulled out from the supply reel 11, and inserted into the cleaning cloth passage 14. The distal end portion of the cleaning cloth 3 is adhered to the winding bobbin 12 by an adhesive. The winding bobbin 12 is assembled to the right-half portion 8 with the cleaning cloth 3 being adhered. Note that it is also possible to adhere the cleaning cloth 3 to the winding bobbin 12 after the winding bobbin 12 is assembled to the right-half portion 8.

After that, the left-half portion 9 of the housing 7 is attached and fixed to the right-half portion 8. Then, the front end portion of the part assembly 111 projected forward from the housing 7 is covered with the head cover 63 from the front. In this state, the rear end portion of the head cover 63 is inserted into the square cylindrical portion 7a of the housing 7 from the front. The head cover 63 is fixed to the head push base 54 when the head push base 54 fits in the head cover 63. The assembling of the optical connector cleaning tool 1 is complete when the head cover 63 is thus fixed to the head push base 54, and the cap 6 is attached to the head cover 63.

When cleaning the connection end face of the stand-alone optical connector plug 95, the optical connector cleaning tool 1 is used by connecting the optical connector plug 95 to the cap 6. When the optical connector plug 95 is connected to the optical connector cleaning tool 1 with the cap 6 being interposed between them, the cleaning cloth 3 is pressed against the connection end face 95a with a predetermined pressing force. When the housing 7 is advanced with respect to the cap 6 in this state, the pressing member 5 retreats with respect to the housing 7, and, along with this action, the cleaning cloth 3 is wound around the winding bobbin 12. As a consequence, the connection end face 95a is wiped by the cleaning cloth 3.

When cleaning an optical connector plug installed inside the optical fiber cable connection port of the electronic apparatus housing 7, the cap 6 is removed from the optical connector cleaning tool 1. An optical connector adaptor is attached beforehand to an optical connector plug installed in an electronic apparatus so that an optical fiber cable can easily be connected. When cleaning the connection end face of an optical connector plug of this kind, the front end portion of the pressing member 5 is inserted into the above-mentioned optical fiber cable connection port, and the front end portion of the head cover 63 is connected to the optical connector adaptor.

When the head cover 63 is connected to the optical connector adaptor, the cleaning cloth 3 is pressed against the connection end face of the optical connector plug, so the pressing member 5 retreats with respect to the housing 7. The cleaning cloth 3 pressed against the connection end face is wound around the winding bobbin 12, thereby wiping the connection end face.

In the optical connector cleaning tool 1 according to this embodiment as described above, the cleaning cloth 3 is fed by the action of pressing the cleaning cloth 3 against an optical connector plug. The transmission mechanism 33 for feeding the cleaning cloth 3 converts the pressing force into a rotational force by the rack 32 and pinion. When compared to the use of a spiral groove, therefore, the structure is simple and can be made compact.

Accordingly, this embodiment can provide an optical connector cleaning tool capable of easily cleaning an optical connector while decreasing the size with a simple structure.

The second guide pin 47 for changing the moving direction of the cleaning cloth 3 by contacting it between the cleaning head 13 and winding bobbin 12 is disposed in the rear end portion (the end portion in the retreating direction) of the pressing member 5 according to this embodiment. When the pressing member 5 retreats, the second guide pin 47 pulls the cleaning cloth 3 in the retreating direction near the winding bobbin 12.

Accordingly, this embodiment can prevent the cleaning cloth 3 from being slackened by the backward movement of the pressing member 5. By moving the pressing member 5 backward, therefore, a cleaning cloth contributing to cleaning can be pulled out from the supply reel 11.

The second guide pin 47 is arranged such that the winding-side end portion 49 of the cleaning cloth 3 has a predetermined length. Here, the winding-side end portion 49 extends from the second guide pin 47 to the winding bobbin 12.

The second guide pin 47 is so positioned that in a state in which the cleaning cloth is wound around the winding bobbin 12 by an amount intermediate between the start and end of winding, a length L1 of the winding-side end portion 49 when the pressing member 5 is positioned in the front position and a length L2 of the winding-side end portion 49 when the pressing member 5 is positioned in the rear position are equal.

In this embodiment, therefore, the wound amount and slack amount of the cleaning cloth 3 reduce as much as possible when the pressing member 5 moves back and forth.

Accordingly, in this embodiment, the cleaning cloth 3 is not wasted, and the cleaning performance does not decrease because the cleaning cloth 3 is largely slackened. This embodiment can provide an optical connector cleaning tool capable of efficiently and stably cleaning an optical connector.

Figure 20:
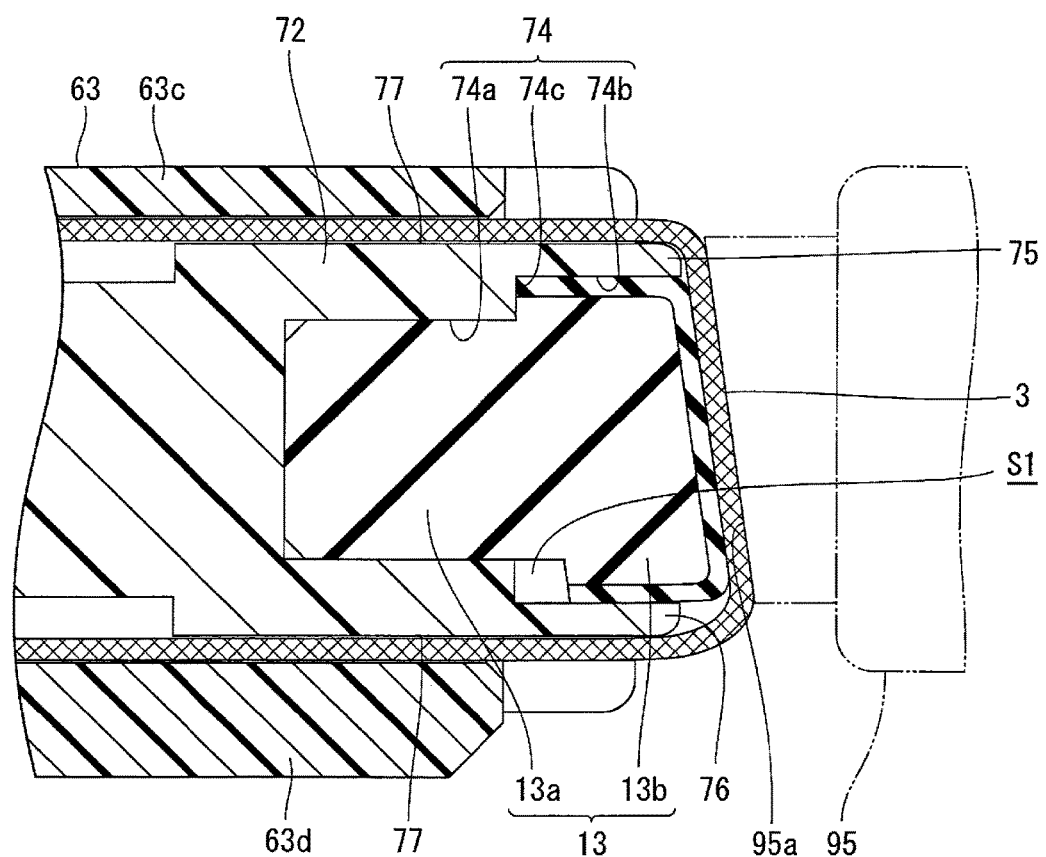
FIG. 20 is an enlarged sectional view showing the front end portion of the pressing member.

The cleaning head 13 according to this embodiment is formed by using an elastic material made of rubber. In this embodiment, the cleaning surface of the cleaning cloth 3 can incline because the cleaning head 13 elastically deforms. As shown in FIG. 20, the optical connector plug 95 sometimes has an inclined connection end face 95a. When the cleaning cloth 3 is pressed against the inclined connection end face 95a, the lateral bar 13b of the cleaning head 13 inclines along the connection end face 95a. Consequently, the cleaning surface of the cleaning cloth 3 comes in tight contact with the connection end face 95a. In this embodiment, therefore, even the inclined connection end face 95a of the optical connector plug 95 can correctly be cleaned. This makes it possible to stabilize the cleaning performance.

The surface portion of the cleaning head 13 according to this embodiment, comes in contact with the cleaning cloth 3, and is so formed as to have a frictional resistance lower than those of other portions.

Since this relatively decreases the force required to feed the cleaning cloth 3, it is possible to reduce the pressing force to be applied by the user during cleaning.

Also, the cleaning head 13 does not excessively incline by being pushed by friction with the cleaning cloth 3. Therefore, the distribution of the force with which the cleaning head 13 pushes the cleaning cloth 3 is not biased in one feeding direction of the cleaning cloth 3.

Accordingly, this embodiment can provide an optical connector cleaning tool capable of easily performing a cleaning operation and stabilizing the cleaning performance.

In this embodiment, the frictional resistance is decreased by increasing the hardness of the surface portion of the cleaning head 13, which comes in contact with the cleaning cloth 3. Therefore, this embodiment can provide an optical connector cleaning tool in which the cleaning head 13 is hardly worn away.

The pressing member 5 according to this embodiment includes the head push 62 which holds the cleaning head 13 in a state in which the cleaning head 13 projects to the front end portion (the distal end portion in the projecting direction).

The recess 74 which opens in the projecting direction and holds the cleaning head 13 is formed in the front end portion of the head push 62.

The cleaning head 13 is formed into a T shape when viewed in the widthwise direction of the cleaning cloth 3, and fitted and held in the recess 74 such that the lateral bar 13b extending in the lateral direction of the T shape is positioned on the distal end side.

The predetermined space S1 is formed between the lateral bar 13b and the bottom surface 74c of the recess 74 in which the lateral bar 13b fits. In this embodiment, the lateral bar 13b of the aforementioned T shape readily inclines in the lateral direction (the vertical direction along which the lateral bar 13b extends). This further facilitates bringing the cleaning cloth 3 into tight contact with the inclined connection end face 95a (see FIG. 20) of the optical connector plug 95. Accordingly, this embodiment can further stabilize the cleaning performance of the optical connector cleaning tool 1.

The pressing member 5 according to this embodiment includes the head push base 54 which supports the head push 62 so that the head push 62 can move in a direction parallel to the moving direction of the pressing member 5. The head push spring 73 biases the head push 62 forward (in the above-mentioned projecting direction) with respect to the head push base 54. The pressing member 5 according to this embodiment also includes the head cover 63 which moves together with the head push base 54 with respect to the housing 7.

The head cover 63 has the abutting portion (the first and second abutting surfaces 91 and 92) which abuts against the abutting target portion of an optical connector plug (i.e., the rear end face 102 of the cap 6 or the rear end face of an optical connector adaptor).

In a state in which the above-mentioned abutting portion of the head cover 63 is abutting against the above-mentioned abutting target portion, the cleaning head 13 according to this embodiment is pressed against the optical connector plug 95 with the cleaning cloth 3 being interposed between them by the spring force of the head push spring 73.

Accordingly, the pressing member 5 according to this embodiment retreats with respect to the housing 7 while maintaining a state in which the cleaning cloth 3 is pressed against the optical connector plug 95 by the spring force of the head push spring 73 during cleaning.

In this embodiment, therefore, it is possible to provide an optical connector cleaning tool capable of always obtaining a constant cleaning performance even when users change, because the cleaning cloth 3 is pressed against an optical connector plug with a constant pressing force during cleaning.

In this embodiment, the pressing force with which the cleaning head 13 presses the cleaning cloth 3 against the optical connector plug 95 by the spring force of the head push spring 73 is set at 5N to 9N.

The cleaning performance and pressing force have a close relationship. In this embodiment, the cleaning cloth 3 is pressed against the optical connector plug 95 with a proper pressing force of 5N to 9N.

Accordingly, this embodiment can provide an optical connector cleaning tool capable of further stabilizing the cleaning performance.

The head push 62 according to this embodiment has the recess 74 which opens forward (in the aforementioned projecting direction), and in which the cleaning head 13 is fitted and held. The head push 62 also includes the pair of walls 75 and 76 sandwiching the cleaning head 13 fitted in the recess 74 from the two sides in the direction (the vertical direction) perpendicular to the projecting direction when viewed in the widthwise direction of the cleaning cloth 3.

If the cleaning head 13 excessively inclines, one end portion of the cleaning head 13 largely projects forward when compared to the other end portion. This projecting portion strongly presses the cleaning cloth 3 against the optical connector plug 95.

Accordingly, the pressing force of pressing the cleaning cloth 3 against the optical connector plug 95 is biased toward the projecting portion, and the frictional resistance increases when the cleaning cloth 3 is fed.

The pair of walls 75 and 76 according to this embodiment regulates the excess inclination of the cleaning head 13. Therefore, this embodiment can provide an optical connector cleaning tool having a stable cleaning performance, because the whole area of the cleaning surface of the cleaning cloth 3 can be pressed against the optical connector plug 95 with an almost uniform pressing force.

The pressing member 5 according to this embodiment includes the cylindrical head cover 63 having the through hole 81 into which the head push 62 is inserted.

A space for passing the cleaning cloth 3 is formed between the through hole 81 and head push 62.

The distal ends of the walls 63c and 63d of the head cover 63, which oppose the cleaning cloth 3, are positioned near the distal end of the head push 62.

The inner wall surfaces of the head cover 63 regulate the movement of the cleaning cloth 3 in the widthwise direction. In this embodiment, since the inner wall surfaces extend to the vicinity of the distal end of the head push 62, the movement of the cleaning cloth 3 in the widthwise direction can be regulated in the vicinity of the distal end of the head push 62. The cleaning cloth 3 moves in the widthwise direction mainly due to a force received from a portion in contact with the optical connector plug 95. Therefore, this embodiment can provide an optical connector cleaning tool capable of reliability regulating the movement of the cleaning cloth 3 in the widthwise direction.

In this embodiment, the space S2 is formed between the two end portions of the cleaning cloth 3 in the widthwise direction in the head push 62, and the wall surfaces of the through hole 81 of the head cover 63, and the space S2 allows the head push 62 to be inserted into the head cover 63.

This makes it possible to form the space S2 between the inner walls of the head cover 63 and the sidewalls of the head push 62 as narrow as possible. Therefore, this embodiment can provide an optical connector cleaning tool capable of more reliably regulating the movement of the cleaning cloth 3 in the widthwise direction.

The head cover 63 is formed in the distal end portion of the pressing member 5 according to this embodiment. The head cover 63 is connected to the cleaning tool connecting portion 97 of the cap 6 including the optical connector plug connecting portion 96 at one end and the cleaning tool connecting portion 97 at the other end.

The optical connector plug connecting portion 96 of the cap 6 has the optical connector plug locking pieces 98 which are locked to the two side portions of the optical connector plug 95, thereby vertically and horizontally positioning the optical connector plug 95 with respect to the cap 6, and preventing removal in the direction parallel to the projecting direction.

The cleaning tool connecting portion 97 of the cap 6 has the cleaning tool locking pieces 101 which are locked to the two side portions of the head cover 63, thereby vertically and horizontally positioning the cap 6 with respect to the head cover 63, and preventing removal in the direction parallel to the projecting direction.

The cleaning tool locking pieces 101 are locked over the projections 94 on the head cover side surfaces in a state in which the read end face 102 of the cap 6 is abutting against the first abutting surface 91 of the head cover 63.

When cleaning the stand-alone optical connector plug 95 by the optical connector cleaning tool 1 according to this embodiment, the optical connector plug 95 is connected to the head cover 63 with the cap 6 being interposed between them. The cap 6 is fixed to the head cover 63 by the cleaning tool locking pieces 101. When removing the optical connector plug 95 from the cap 6 after cleaning, the optical connector plug 95 comes off from the cap 6 while the cap 6 is attached to the head cover 63.

Accordingly, this embodiment can provide an optical connector cleaning tool having a high operability, because the optical connector plug 95 can reliably be removed from the cap 6 after cleaning.

The optical connector plug locking pieces 98 of the cap 6 according to this embodiment are so formed as to have a length equal to that of the optical connector plug locking pieces formed on an optical connector adaptor to be connected to the optical connector plug 95. The cleaning tool locking pieces 101 of the cap 6 are formed to be longer than the optical connector plug locking pieces 98.

When an optical connector adaptor is connected to the head cover 63, therefore, the locking pieces of the optical connector adaptor are not locked to the head cover 63.

Accordingly, this embodiment can provide an optical connector cleaning tool having a higher operability, because it is possible to reliably prevent the head cover 63 from being unnecessarily locked to an optical connector adaptor.

The head cover 63 according to this embodiment includes the first abutting surface 91 and second abutting surfaces 92. The first abutting surface 91 abuts against the read end face 102 of the cap 6, thereby performing positioning in the direction parallel to the projection direction (longitudinal direction). The second abutting surfaces 92 are positioned closer to the front-end side of the head cover 63 than the first abutting surface 91, and abut against the read end face of an optical connector adaptor to which the optical connector plug 95 is connected, thereby performing positioning in the direction parallel to the projecting direction.

It is, therefore, possible to accurately perform positioning in the longitudinal direction (projecting direction) when cone ting the cap 6 to the head cover 63, and when connecting an optical connector adaptor to the head cover 63.

This makes it possible to provide an optical connector cleaning tool capable of further improving the cleaning performance, because the pressing force of pressing the cleaning cloth 3 against an optical connector is always constant.

The optical connector cleaning tool 1 according to this embodiment includes the slide spring 53 which biases the pressing member 5 forward with respect to the housing 7. The guide rod 41b of the slider 41 extends through the slide spring 53. Accordingly, the guide rod 41b can prevent deformation of the slide spring 53 caused by buckling upon compression.

Since, therefore, a relatively narrow spring can be used as the slide spring 53, the nose 4 can be downsized. Also, the assembling workability improves because the slide spring 53, slider 41, and head push base 54 can be assembled as one assembly to the housing 7.

The one-way clutch 35 for transmitting the rotational force to the winding bobbin 12 only when the bobbin rotating gear 31 rotates in the winding direction is formed between the winding bobbin 12 and bobbin rotating gear 31 according to this embodiment. When the pressing member 5 moves forward after backward movement, therefore, the bobbin rotating gear 31 does not rotate the winding bobbin 12 in the direction opposite to the winding direction. Consequently, the cleaning cloth 3 is correctly fed in one direction.

The reverse rotation preventing mechanism 27 including the pawl 25 and the large number of pawls 26 is formed between the winding bobbin 12 and the left-half portion 9 of the housing 7. When the pressing member 5 having moved backward moves forward, therefore, the winding bobbin 12 does not rotate in the direction opposite to the winding direction, so the cleaning cloth 3 does not slacken due to the reverse rotation of the winding bobbin 12. This reduces variations in feeding amount of the cleaning cloth 3.

The projecting pieces 83 which fit in the guide grooves 68 formed in the two side portions of the head push base 54 are formed in the front portion of the head cover 63 according to this embodiment. Therefore, the head push 62 does not vertically tilt in the head cover 63, thereby narrowing the cleaning cloth passages 14. Also, the distribution of the pressing force with which the cleaning head 13 presses the cleaning cloth 3 does not vary because the cleaning head 13 can strongly be held. Accordingly, it is possible to prevent tucking of the cleaning cloth 3, and stabilize the cleaning performance.

The head cover 63 according to this embodiment has the ribs 93 which come in contact with the walls 103 and 104 of the cap 6. This increases the frictional force when attaching and detaching the cap 6 to and from the head cover 63. As a consequence, when pulling out the optical connector plug 95 from the cap 6 after cleaning is performed using the cap 6, the cap 6 is not removed together with the optical connector plug 95 from the head cover 63. Therefore, this embodiment can provide an optical connector cleaning tool having a high operability because the cap 6 is not unnecessarily removed from the head cover 63.

The housing 7 according to this embodiment includes the partitions 16 and 17 surrounding the supply reel 11. Therefore, dust particles sticking to the cleaning cloth 3 used in cleaning and wound around the winding bobbin 12 do not move to the cleaning cloth 3 of the supply reel 11. That is, it is possible to prevent contamination of an unused cleaning cloth 3.

The cap 6 capable of closing the front-end opening can be attached to the optical connector cleaning tool 1 according to this embodiment. This makes it possible to reliably prevent dust particles in the air from entering the housing 7 from the side of the cleaning head 13 when not in use. Accordingly, the optical connector cleaning tool 1 does not decrease the cleaning performance when stored because the cap 6 is attached.

The elastic deformation portion 48a of the tap tone generator 48 according to this embodiment is formed into a C shape when viewed sideways. When using the tap tone generator 48, therefore, no stress concentrates to the elastic deformation portion 48a. Accordingly, the tap tone generator 48 neither deforms nor breaks even when repetitively used. That is, the creep resistance of the tap tone generator 48 improves. Note that the shape of the elastic deformation portion 48a is not limited to the C shape in a side view, and can appropriately be changed. For example, the elastic deformation portion 48a can be formed into a U shape in a side view.

The slide spring 53 according to this embodiment is positioned between the cleaning cloth 3 fed forward and the cleaning cloth 3 pulled backward. Since the cleaning cloth 3 is positioned outside the slide spring 53, therefore, assembling can easily be performed, so the assembling workability improves.

The right-half portion 8 of the housing 7 of this embodiment is so formed that the whole areas of the cleaning cloth passages 14 open toward the left-half portion 9. Accordingly, the assembling workability improves because the work of placing the cleaning cloth 3 in the cleaning cloth passages 14 can easily be performed.

The front end portions of the cleaning cloth passages 14 according to this embodiment include the head push base 54, the head push 62 having the cleaning head 13, and the head cover 63 surrounding these members. Therefore, the cleaning cloth 3 is passed through the cleaning cloth passages 14 by inserting the head push base 54 and head push 62 into the head cover 63 in a state in which the cleaning cloth 3 is extended along these members. Accordingly, the optical connector cleaning tool 1 according to this embodiment can be assembled without passing the cleaning cloth 3 through a thin slit, and hence has a high assembling workability.

The core 12b of the winding bobbin 12 according to this embodiment includes the recess 28 and pin 29. Therefore, the distal end portion of the cleaning cloth 3 can attached to the winding bobbin 12 by using an adhesive for temporarily attaching the distal end portion of the cleaning cloth 3 to the supply reel 11, without twisting the cleaning cloth 3. Since the distal end portion of the cleaning cloth 3 can easily be fixed to the winding bobbin 12, the assembling workability improves.

The supply reel 11 and winding bobbin 12 according to this embodiment include the disk-like guides 11a and 12a. The cleaning cloth 3 is accommodated in the housing 7 while movement in the widthwise direction is regulated by the guides 11a and 12a and the left-half portion 9 of the housing 7. Therefore, the number of guide portions to be used to hold the cleaning cloth 3 on the supply reel 11 and winding bobbin 12 is smaller than that of a structure in which the cleaning cloth 3 is sandwiched between two guide portions. In this embodiment, therefore, the housing 7 is made compact in the widthwise direction of the cleaning cloth 3. Also, since the whole area of the cleaning cloth 3 is exposed by removing the left-half portion 9 of the housing 7 from the right-half portion 8, the workability of the work of assembling or replacing the cleaning cloth 3.

EXPLANATION OF THE REFERENCE NUMERALS AND SIGNS

1 . . . optical connector cleaning tool, 3 . . . cleaning cloth, 5 . . . pressing member, 7 . . . housing, 11 . . . supply reel, 12 . . . winding bobbin, 13 . . . cleaning head, 31 . . . bobbin rotating gear (pinion), 33 . . . transmission mechanism, 32 . . . rack, 53 . . . slide spring

The invention claimed is:

1. An optical connector cleaning tool comprising:
   a supply reel around which a belt-like cleaning cloth is wound;
   a winding bobbin configured to wind said cleaning cloth fed from said supply reel;
   a housing configured to support said supply reel and said winding bobbin such that said supply reel and said winding bobbin are allowed to rotate in a direction in which said cleaning cloth is fed;
   a cleaning head configured to come in contact with a portion of said cleaning cloth positioned between said supply reel and said winding bobbin;
   a pressing member configured to support said cleaning head such that a portion of said cleaning cloth is pushed by said cleaning head and projected from said housing, and supported by said housing such that said pressing member is allowed to move in parallel in the projecting direction and a retreating direction opposite to the projecting direction;
   a slide spring configured to bias said pressing member in the projecting direction; and
   a transmission mechanism configured to transmit an action of said pressing member to said winding bobbin, said transmission mechanism including a rack formed in said pressing member, and a pinion formed in said winding bobbin such that said pinion meshes with said rack, and configured to rotate said winding bobbin in a winding direction such that said cleaning cloth is fed when said pressing member moves in the retreating direction with respect to said housing.

2. The optical connector cleaning tool according to claim 1, wherein
   a guide configured to change a moving direction of said cleaning cloth by contacting said cleaning cloth between said cleaning head and said winding bobbin is formed in an end portion of said pressing member in the retreating direction, and
   said guide pulls said cleaning cloth in the retreating direction near said winding bobbin when said pressing member retreats.

3. The optical connector cleaning tool according to claim 2, wherein
   said guide is arranged such that a winding-side end portion of said cleaning cloth, said winding-side end portion extending from said guide to said winding bobbin, has a predetermined length, and
   a position of said guide is determined such that in a state in which said cleaning cloth is wound around said winding bobbin by an amount intermediate between start and end of winding, the length of the winding-side end portion when said pressing member is positioned in an end portion in the projecting direction is equal to the length of the winding-side end portion when said pressing member is positioned in an end portion in the retreating direction.

4. The optical connector cleaning tool according to claim 1, wherein said cleaning head is formed by an elastic material made of rubber.

5. The optical connector cleaning tool according to claim 4, wherein a surface portion of said cleaning head, which comes in contact with said cleaning cloth, is formed to have a frictional resistance lower than those of other portions.

6. The optical connector cleaning tool according to claim 4, wherein said pressing member includes a head push configured to hold said cleaning head such that said cleaning head projects to a distal end portion in the projecting direction,
- a recess which opens in the projecting direction and holds said cleaning head is formed in the distal end portion of said head push,
- said cleaning head is formed into a T shape when viewed in a widthwise direction of said cleaning cloth, and fitted in and held by said recess such that a lateral bar extending in a lateral direction of the T shape is positioned on a distal-end side, and
- a gap having a predetermined width is formed between said lateral bar and a bottom surface of said recess in which said lateral bar fits.

7. The optical connector cleaning tool according to claim 4, wherein said pressing member includes:
- a head push configured to hold said cleaning head such that said cleaning head projects to a distal end portion in the projecting direction;
- a head push base configured to support said head push such that said head push is movable in a direction parallel to the moving direction of said pressing member;
- a head push spring configured to bias said head push in the projecting direction with respect to said head push base; and
- a head cover configured to move together with said head push base with respect to said housing,
- said head cover includes an abutting portion configured to abut against a portion to be abutted of an optical connector, and
- said cleaning head is pressed against an optical connector with said cleaning cloth being interposed therebetween by a spring force of said head push spring in a state in which said abutting portion of said head cover is abutting against said portion to be abutted.

8. The optical connector cleaning tool according to claim 7, wherein a pressing force with which said cleaning head presses said cleaning cloth against an optical connector by the spring force of said head push spring is 5N to 9N.

9. The optical connector cleaning tool according to claim 4, wherein
- said pressing member includes a head push configured to hold said cleaning head such that said cleaning head projects to a distal end portion in the projecting direction, and
- said head push includes a recess which opens in the projecting direction and in which said cleaning head is fitted and held, and a pair of walls configured to sandwich said cleaning head fitted in said recess from two sides in a direction perpendicular to the projecting direction when viewed in a widthwise direction of said cleaning cloth.

10. The optical connector cleaning tool according to claim 1, wherein
said pressing member includes:
- a head push configured to hold said cleaning head such that said cleaning head projects to a distal end portion in the projecting direction; and
- a cylindrical head cover having a hole into which said head push is inserted,
- wherein a space through which said cleaning cloth is passed is formed between the hole and said head push, and
- a distal end of a wall of said head cover, which opposes said cleaning cloth, is positioned near the distal end of said head push.

11. The optical connector cleaning tool according to claim 1, wherein said pressing member includes:
- a head push configured to hold said cleaning head such that said cleaning head projects to a distal end portion in the projecting direction; and
- a cylindrical head cover having a hole into which said head push is inserted,
- wherein a space through which said cleaning cloth is passed is formed between the hole and said head push, and
- a gap is formed between both end portions of said head push in a widthwise direction of said cleaning cloth, and wall surfaces of the hole which oppose the both end portions, said gap allowing said head push to be inserted into said head cover.

12. The optical connector cleaning tool according to claim 1, further comprising:
- a head cover is provided in a distal end portion of said pressing member, said head cover configured to be connected to a cleaning tool connecting portion of a cap, said cap having an optical connector plug connecting portion formed at one end and said cleaning tool connecting portion formed in the other end,
- optical connector plug locking pieces are provided in said optical connector plug connecting portion of said cap, said optical connector plug locking pieces configured to be locked to two side portions of an optical connector plug, thereby vertically and horizontally positioning the optical connector plug with respect to said cap, and preventing removal in a direction parallel to the projecting direction, and
- cleaning tool locking pieces are provided in said cleaning tool connecting portion of said cap, said cleaning tool locking pieces configured to be locked to two side portions of said head cover, thereby vertically and horizontally positioning said cap with respect to said head cover, and preventing removal in the direction parallel to the projecting direction,
- wherein said cleaning tool locking pieces are locked over projections on the head cover side surfaces in a state in which an end face of said cap is abutting against an abutting surface of said head cover.

13. The optical connector cleaning tool according to claim 1, further comprising:
- a head cover is provided in a distal end portion of said pressing member, said head cover configured to be connected to a cleaning tool connecting portion of a cap, said cap having an optical connector plug connecting portion formed at one end and said cleaning tool connecting portion formed at the other end,
- optical connector plug locking pieces are provided in said optical connector plug connecting portion of said cap, said optical connector plug locking pieces configured to be locked to two side portions of an optical connector plug, thereby vertically and horizontally positioning the optical connector plug with respect to said cap, and preventing removal in a direction parallel to the projecting direction, and
- cleaning tool locking pieces are provided in said cleaning tool connecting portion of said cap, said cleaning tool locking pieces configured to be locked to two side portions of said head cover, thereby vertically and horizontally positioning said cap with respect to said head cover, and preventing removal in the direction parallel to the projecting direction, wherein said optical connector plug locking pieces are formed to have a length equal to that of optical connector plug locking pieces formed in an optical connector adaptor to which the optical connector plug is connected, and said cleaning tool locking pieces are formed to be longer than said optical connector plug locking pieces.

14. The optical connector cleaning tool according to claim 1, further comprising:

a head cover is provided in a distal end portion of said pressing member, said head cover configured to be connected to a cleaning tool connecting portion of a cap, said cap having an optical connector plug connecting portion formed at one end and said cleaning tool connecting portion formed at the other end, optical connector plug locking pieces are provided in said optical connector plug connecting portion of said cap, said optical connector plug locking pieces configured to be locked to two side portions of an optical connector plug, thereby vertically and horizontally positioning the optical connector plug with respect to said cap, and preventing removal in a direction parallel to the projecting direction, and cleaning tool locking pieces are provided in said cleaning tool connecting portion of said cap, said cleaning tool locking pieces configured to be locked to two side portions of said head cover, thereby vertically and horizontally positioning said cap with respect to said head cover, and preventing removal in the direction parallel to the projecting direction, wherein said head cover includes a first abutting surface configured to perform positioning in the direction parallel to the projecting direction by abutting against an end face of said cap, and a second abutting surface positioned closer to a distal end of said head cover than said first abutting surface, and configured to perform positioning in the direction parallel to the projecting direction by abutting against an end face of an optical connector adaptor to which the optical connector plug is connected.

\* \* \* \* \*